(12) United States Patent
Ma et al.

(10) Patent No.: US 10,840,783 B2
(45) Date of Patent: Nov. 17, 2020

(54) PROCESS AND PROCESS APPARATUS FOR FORMING PROTECTIVE COATING ON MAGNETIC POLE OF PERMANENT MAGNET MOTOR

(71) Applicant: BEIJING GOLDWIND SCIENCE & CREATION WINDPOWER EQUIPMENT CO., LTD., Beijing (CN)

(72) Inventors: Shengjun Ma, Beijing (CN); Wanshun Ma, Beijing (CN)

(73) Assignee: Beijing Goldwin Science & Creation Equipment Co., Ltd., Beijing (CN)

( * ) Notice: Subject to any disclaimer, the term of this patent is extended or adjusted under 35 U.S.C. 154(b) by 304 days.

(21) Appl. No.: 16/067,774

(22) PCT Filed: Sep. 4, 2017

(86) PCT No.: PCT/CN2017/100336
§ 371 (c)(1),
(2) Date: Jul. 2, 2018

(87) PCT Pub. No.: WO2018/076939
PCT Pub. Date: May 3, 2018

(65) Prior Publication Data
US 2019/0028007 A1 Jan. 24, 2019

(30) Foreign Application Priority Data
Oct. 31, 2016 (CN) .......................... 2016 1 0943100

(51) Int. Cl.
*H02K 15/03* (2006.01)
*H02K 1/27* (2006.01)
(Continued)

(52) U.S. Cl.
CPC .............. *H02K 15/03* (2013.01); *H02K 1/278* (2013.01); *H02K 1/2786* (2013.01); *H02K 9/04* (2013.01);
(Continued)

(58) Field of Classification Search
CPC ........ H02K 15/03; H02K 15/10; H02K 15/12; H02K 9/14; H02K 1/278; H02K 1/2786; H02K 1/28
See application file for complete search history.

(56) References Cited

U.S. PATENT DOCUMENTS 4,588,467 A * 5/1986 Tani .................... B29C 66/54
156/294
7,642,689 B2 1/2010 Suzuki et al.
(Continued)

FOREIGN PATENT DOCUMENTS

CN 101572461 A 11/2009
CN 101976918 A 2/2011
(Continued)

OTHER PUBLICATIONS

Extended European Search Report issued by European Patent Office for counterpart Application No. 17864981.0, dated Jun. 27, 2019.
(Continued)

*Primary Examiner* — Jue Zhang
(74) *Attorney, Agent, or Firm* — Finnegan, Hendrson, Farabow, Garrett & Dunner LLP

(57) ABSTRACT

A process and process apparatus for forming a protective coating on a magnetic pole of a permanent magnet motor. The process for forming a protective coating on a magnetic pole of a permanent magnet motor includes: horizontally placing a motor rotor, and controlling to perform, at positions of an inlet and an outlet operating on a vacuum bag in a current state, vacuumization and adhesive injection only
(Continued)

on an arc section located at the bottom of the motor rotor; and driving the motor rotor to rotate by a predetermined angle after the adhesive in the arc section is initially cured so as to rotate the next arc section in which no adhesive is injected to the bottom, until all arc sections in the circumferential direction of the motor rotor are injected with the adhesive.

27 Claims, 19 Drawing Sheets

(51) Int. Cl.
    *H02K 15/12*     (2006.01)
    *H02K 9/04*     (2006.01)
    *H02K 15/10*     (2006.01)
    *H02K 1/28*     (2006.01)

(52) U.S. Cl.
    CPC ............ *H02K 15/10* (2013.01); *H02K 15/12* (2013.01); *H02K 1/28* (2013.01)

(56) References Cited

U.S. PATENT DOCUMENTS

| | | |
|---|---|---|
| 7,876,011 B2 | 1/2011 | Stiesdal |
| 2009/0267436 A1 | 10/2009 | Stiesdal |
| 2010/0237734 A1* | 9/2010 | Rinck ................. H02K 1/2786 310/156.23 |
| 2012/0326545 A1 | 12/2012 | Stiesdal |
| 2015/0171718 A1* | 6/2015 | Rasmussen .......... H02K 1/2786 310/156.21 |
| 2015/0188370 A1 | 7/2015 | Stiesdal |
| 2017/0252985 A1 | 9/2017 | Wang et al. |

FOREIGN PATENT DOCUMENTS

| | | |
|---|---|---|
| CN | 102013770 A | 4/2011 |
| CN | 102771037 A | 11/2012 |
| CN | 102969847 A | 3/2013 |
| CN | 103107662 A | 5/2013 |
| CN | 104325657 A | 2/2015 |
| CN | 106469964 A | 3/2017 |
| EP | 2887501 A1 | 12/2013 |

OTHER PUBLICATIONS

1st Office Action issued in Australian Patent Application No. 2017352143, dated Mar. 7, 2019.
International Search Report issued in International Application No. PCT/CN2017/100336, mailed from the State Intellectual Property Office of the People's Republic of China dated Dec. 4, 2017.

* cited by examiner

PROCESS AND PROCESS APPARATUS FOR FORMING PROTECTIVE COATING ON MAGNETIC POLE OF PERMANENT MAGNET MOTOR

CROSS-REFERENCE TO RELATED APPLICATIONS

The present application is a National Phase entry of PCT Application No. PCT/CN2017/100336, filed on Sep. 4, 2017, which claims the benefit of priority to Chinese patent application No. 201610943100.7 titled "PROCESS AND PROCESS APPARATUS FOR FORMING PROTECTIVE COATING FOR MAGNETIC POLE OF PERMANENT MAGNET MOTOR", filed with the Chinese State Intellectual Property Office on Oct. 31, 2016, both of which are incorporated herein by reference in their entireties.

FIELD

This application relates to the technical field of motors, and in particular to a process and a process apparatus for forming a protective coating for a magnetic pole of a permanent magnet motor.

BACKGROUND

A permanent magnet motor is an electromagnetic device which may convert mechanical energy into electrical energy or convert electrical energy into mechanical energy by means of a magnetic field. The permanent magnet motor is widely used in various power generation sites. The magnetic property of a permanent magnet material for the permanent magnet motor is one of the important factors affecting the power generation performance of the permanent magnet motor.

Reference is made to FIG. 1 and FIG. 2. FIG. 1 is a schematic view showing a partial structure of a permanent magnet motor in the conventional technology. FIG. 2 is a schematic view of a process apparatus for forming a protective coating for a magnetic pole of the permanent magnet motor in the conventional technology.

The permanent magnet motor includes a magnet yoke wall 1, a batten 2 and a magnet steel 3. The magnet yoke wall 1 is generally in a cylindrical shape. The batten 2, which is pre-processed, is mounted onto an inner peripheral wall of the magnet yoke wall 1 using a fastener such as a bolt 4. The batten 2 extends axially. Multiple battens 2 are evenly distributed circumferentially. After the multiple battens 2 are fixed, the magnet steel 3 is pushed axially to a position between the adjacent battens. Each of the multiple battens 2 is generally trapezoidal in cross-section, that is, each of two sidewalls of the batten 2 is a trapezoidal ramp. The position of the magnet steel 3 is radially restricted in a trapezoidal space formed by the adjacent battens 2. The magnet steel 3 is made from a permanent magnet material. A main composition of the permanent magnet material is an alloy of neodymium, iron and boron. Iron and neodymium in the alloy of neodymium, iron and boron are apt to be oxidized, which causes magnetic property to be changed. Therefore, in order to prevent the external environment from affecting the magnetic property of the magnet steel 3 as far as possible, a protective coating 6 is generally poured to a surface of the magnet steel 3, which is described in detail hereinafter.

Firstly, a motor rotor is placed vertically, and then a vacuum bag 7 is mounted to an inner wall of the magnet yoke wall 1. The vacuum bag and the magnet yoke wall 1 form a mold cavity. The batten 2 and the magnet steel 3 are enclosed by the mold cavity. In generally, in order to increase the strength of the protective coating 6, a layer of fiber reinforcing material is further pre-laid to a surface of each of the battens 2 and a surface of the magnet steel 3. Next, the mold cavity is evacuated by a vacuum pump 10, such that the reinforcing material is compacted onto the surfaces of the battens 2 and the surface of the magnet steel 3, and the residual air between the surfaces of the magnet steel 3 and the magnet yoke wall 1 is led out. Then, an adhesive (resin) is extracted from a storage tank 8 and injected into the mold cavity. The resin enters the mold cavity from an adhesive inlet 7a located at a lower portion of the mold cavity. The resin impregnates the fiber reinforcement material, fills a gap between the magnet steel 3 and the magnet yoke wall 1, a gap between the magnet steel 3 and the batten 2, and covers the surfaces of the battens 2 and the surfaces of the magnet steel 3, while the resin flows vertically towards another end of the mold cavity in an axial direction of the motor rotor. After the entire mold cavity and the gaps are filled up with the adhesive, a contact surface of a solid, in the mold cavity, in contact with the adhesive is infiltrated and impregnated by the adhesive, and a curing process is controlled for forming the protective coating 6 which is made from a resin-based reinforcing material. A resin collector 9 for collecting excessive resin is further connected to an adhesive outlet 7b of the vacuum bag 7.

Although the magnet steel 3 is well protected by the protective coating 6 to a certain extent, the moisture in the ambient environment may cause chemical changes of the fiber and the matrix of the adhesive during long-term use, which causes the performance degrade of the fiber and the matrix. Moreover, the moisture may reach an interface between the protective coating 6 and the batten 2 and an interface between the protective coating 6 and the magnet steel 3 through diffusion, which causes the mutually bonded interfaces to be peeled off from each other, thereby degrading the mechanical property of each of the materials. The adhesive may be subjected to mismatch deformation and mismatch stress due to expansion and shrinkage in an environment where the temperature changes and the humidity changes, which causes the deformation of the structure and damage to the materials.

Many micro-cracks and other defects inevitably occur in the bonded interfaces in the molding process. Since opening conditions and closing conditions of the micro-cracks are different from one another during expansion due to a temperature rise and during shrinkage due to a temperature drop, the thermal expansion coefficient in the process of the temperature rise is not same with the thermal expansion coefficient in the process of the temperature drop. The cracks or the peeled-off layers may gradually become larger, which degrades the mechanical properties of the protective coating 6. Moreover, water molecules may first easily intrude into a free space and micro-defects such as holes, bubbles and micro-cracks inside the protective coating 6 during use, thus the moisture absorption in an initial stage is quick.

In addition, for a permanent magnet direct-drive wind power generator having an outer rotor, a holder for a stator iron core and an outer wall of a rotor are cooled with natural wind in the conventional cooling technology, at the same time, a certain amount of wind in the natural environment enters a cavity inside a motor through a gap between a stator and a rotor of the generator, and then flows to another end of the cavity in an axial direction of the motor via an air gap inside the cavity to be accumulated. The deposited light air is squeezed out of a seal at a rear end of the motor and discharged into the atmosphere. The air flowing through the gap inside the motor is a gas(vapor)-liquid-solid multi-phase flow (including air, water vapor, rain, snow, salt frog, sand and dust, flocs, etc.). They may deteriorate the insulating property, as a result of this, the electrical insulating property and the mechanical properties of the motor are deteriorated, the remaining withstand voltage level and the remaining life are reduced, which finally causes failure of the protective coating 6.

Therefore, a technical issue to be addressed presently by the person skilled in the art is to increase the service life of the protective coating 6 on the surface of the magnet steel 3 of the motor.

SUMMARY

In order to address the technical issue described above, a process apparatus for forming a protective coating for a magnetic pole of a permanent magnet motor is provided according to the present application. An inner wall of a magnet yoke wall of a motor rotor of the permanent magnet motor has a vacuum bag. The inner wall and an outer peripheral wall of the vacuum bag form a mold cavity required for injection of an adhesive. The process apparatus includes:

a positioning component for axially positioning the motor rotor at a horizontal position;

a drive component for driving the motor rotor to rotate with respect to a horizontal central axis of the motor rotor; and an adhesive injection assembly for evacuating an arc section of the motor rotor located at a bottom of the motor rotor and injecting the adhesive into the arc section.

In addition, a process for forming the protective coating of the magnetic pole of the permanent magnet motor is further provided according to the present application, which includes the following steps S1, S2 and S3.

In step S1, a vacuum bag is assembled to a magnet yoke wall of a motor rotor. An inner peripheral wall of the vacuum bag and an inner wall of the magnet yoke wall form a mold cavity required for injection of an adhesive. A magnetic pole component, a batten and a reinforcing material are enclosed in the mold cavity. Then, the assembled motor rotor is axially positioned at a horizontal position.

In step S2, the positions of an inlet and an outlet of the vacuum bag in a current state are controlled to desorb only an arc section of the motor rotor located at a bottom of the motor rotor and to inject the adhesive into the arc section. After the adhesive in the above arc section is primarily cured, the motor rotor is driven to rotate by a predetermined angle for rotating the next arc section not injected with the adhesive to the bottom of the motor rotor.

In step S3, step S2 is repeated until injection of the adhesive into all circumferential arc sections of the motor rotor is completed, and finally the entire protective coating primarily cured is secondarily cured.

Compared with vertical injection of the adhesive into the motor rotor in conventional technology, in the process apparatus according to the present application, the motor rotor may be placed horizontally. When the adhesive is injected into the arc section located at the bottom of the motor rotor, the adhesive impregnates clearance between the magnet steel and the magnet yoke wall and impregnates the reinforcing material, at the same time, the adhesive is affected by the gravity, the radial pressure gradient and the axial pressure gradient, i.e. the adhesive seeps in a vertical downward gravity direction and the adhesive impregnates the reinforcing material and diffuses in the reinforcing material, which addresses filling issues of filling the clearance between the magnet steel and the magnet yoke wall and the clearance between the magnet steel and a magnet steel layer, thus, filling of the clearance with the adhesive is ensured, the magnet steel is wrapped, and the corrosion of the magnet steel by the air carrying salt frog and water vapor is avoided. In this way, since there is a medium between the magnet steel and the magnet yoke wall for transferring the heat generated in operation, temperature rise of the magnet steel may be suppressed, thus, the performance of the magnet steel may not be destroyed due to the temperature rise and the corrosion.

Since the process for forming the protective coating for the magnetic pole of the permanent magnet motor is implemented based on the above process apparatus, the process also has the above technical effects of the process apparatus.

DETAILED DESCRIPTION OF EMBODIMENTS

Figure 1:
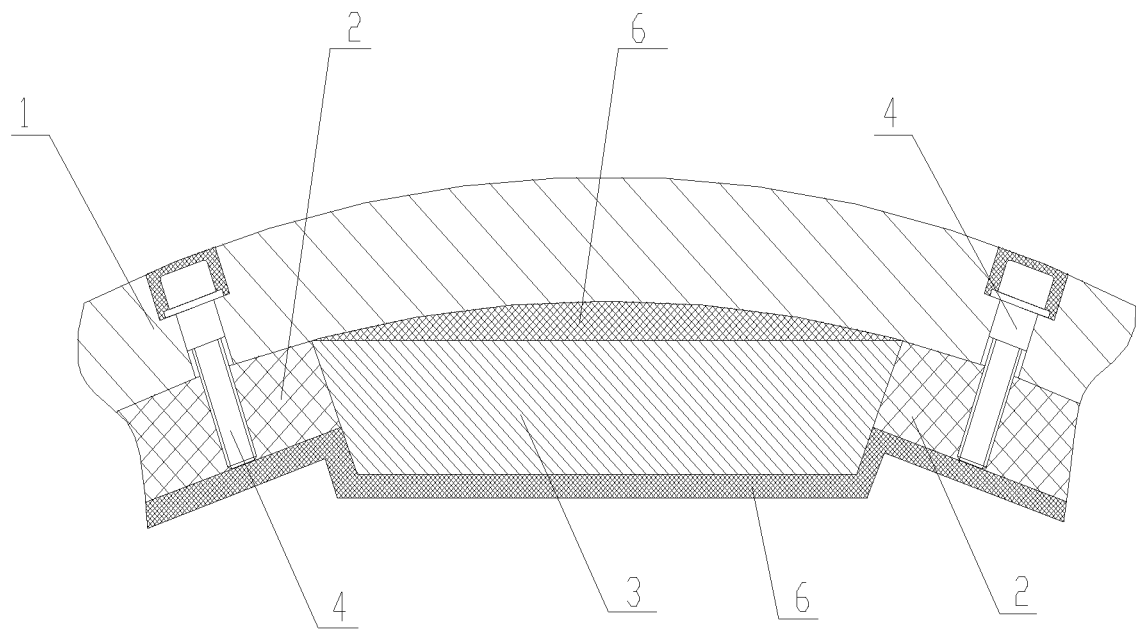
FIG. 1 is a schematic view showing the partial structure of a permanent magnet motor in the conventional technology.
Figure 2:
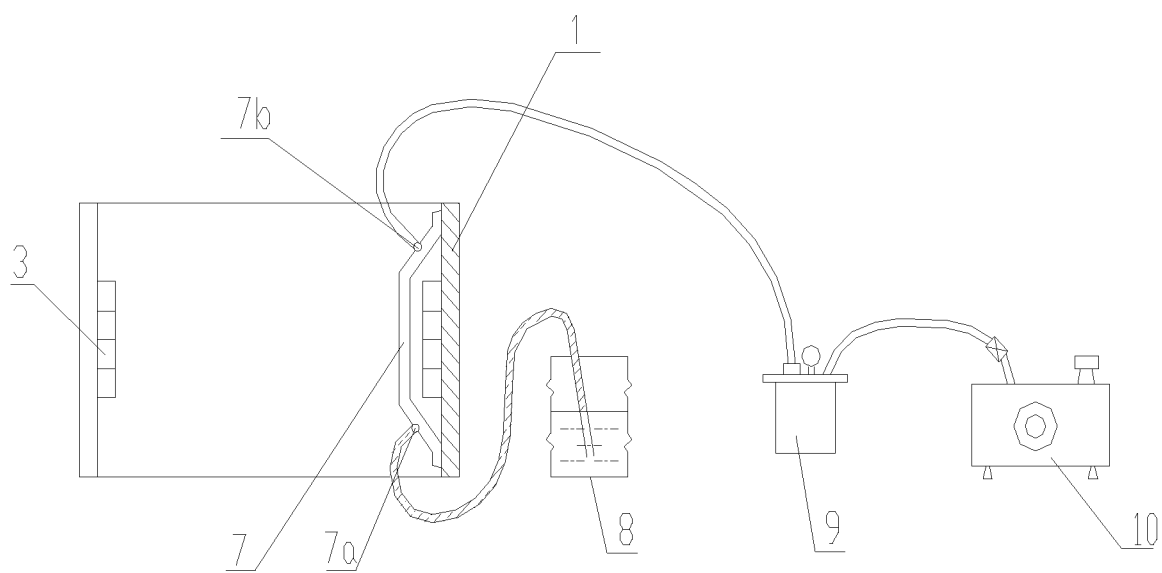
FIG. 2 is a schematic view of a process apparatus for forming a protective coating for a magnetic pole of a permanent magnet motor in the conventional technology.

For the technical issue mentioned in the background that a bonding surface is apt to peel off the protective coating 6 of the conventional technology magnetic pole component 3 when the protective coating 6 is in operation for a long time, in the present application, the following researches are carried out and the following technical solutions are described by taking an outer rotor as an example. Of course, the theory and the apparatus in the present application may also be applied in a motor having an inner rotor. By taking the adhesive being resin as an example, a lot of tests are carried out. It is found through the tests that when a motor rotor is vertically placed on a service platform in an axial direction of the motor rotor, there are still some "bubbles" in a region from a lower end of a magnet yoke wall of the rotor to a position at one third of the axial height of the magnet yoke wall, when an operator views the axial height in the rotor directly. Moreover, the result may be different when a reinforcing material having a different density is used.

For the above test phenomenon, in the present application, in-depth study and in-depth analysis are conducted. Firstly, the pressure drop gradient in an open system for evacuation is analyzed. A surface of the adhesive inside a resin storage tank 8 is subjected to the atmospheric pressure. There is a sharp reduction in the cross-sectional area of a delivery channel at an injection inlet of a suction pipeline, which generates local loss. The local loss coefficient is about 0.5. The adhesive is injected into an adhesive injection port through 6 hoses to 8 hoses, and the local loss coefficient is

| Reference Numerals in FIGS. 1 to 5: | | | |
|---|---|---|---|
| 1 | magnet yoke wall, | 2 | batten, |
| 3 | magnet steel, | 4 | bolt, |
| 6 | protective coating, | 7 | vacuum bag, |
| 7a | adhesive inlet, | 7b | adhesive outlet, |
| 8 | storage tank, | 9 | resin collector, |
| 10 | vacuum pump. | | |

| Reference Numerals in FIGS. 6 to 24: | | | |
|---|---|---|---|
| 100 | support platform, | 101 | roller, |
| 200 | drive component, | 201 | drive shaft, |
| 202 | flexible coupling, | 203 | transition joint, |
| 204 | flange, | 205 | servomotor, |
| 206 | servomotor sensor, | 207 | base, |
| 300 | motor rotor, | 301 | magnetic pole component, |
| 302 | protective coating, | 303 | magnet yoke wall, |
| 304 | reinforcing material, | 401 | first vibration component, |
| 402 | second vibration component, | 4021 | horn type radiation emitter, |
| 4022 | ultrasonic generator, | 500 | adhesive injection assembly, |
| 501 | vacuum bag, | 501a | inlet, |
| 501b | outlet, | 502 | vacuum pump drive motor, |
| 503 | vacuum pump control valve, | 504 | adhesive collector, |
| 505 | adhesive storage tank, | 506 | vacuum pump, |
| 507 | seat, | 600 | desorption assembly, |
| 601 | heater, | 602 | inlet filtering component, |
| 603 | outlet filtering component, | 604 | heat exchanger, |
| 700 | second heating device, | 701 | induction heating power supply, |
| 702 | electromagnetic cable, | 703 | temperature sensor, |
| 801 | inlet fluid slip ring, | 802 | outlet fluid slip ring, |
| 900 | first heating device, | 901 | slide rail, |
| 902 | moving main body, | 902a | slider, |
| 9021 | body, | 9022 | horizontal cantilever module, |
| 90221 | first horizontal cantilever, | 90222 | second horizontal cantilever, |
| 90223 | third horizontal cantilever, | 90224 | fourth horizontal cantilever, |
| 903 | electromagnetic cable, | 904 | coil bobbin, |
| 9041 | cable duct, | 905 | hydraulic system, |
| 906 | power supply, | 907 | distance measuring sensor, |
| 9071 | first distance measuring sensor, | 9072 | second distance measuring sensor, |
| 9073 | third distance measuring sensor, | 9074 | fourth distance measuring sensor, |
| 908 | axial distance measuring sensor, | 110 | inner pole plate, |
| 111 | outer pole plate, | 120 | ultraviolet radiation component. |

0.5 at each connection port. An average flow rate of the adhesive (such as resin) input into the mold cavity of the vacuum bag 7 is equal to an average lowering rate of the liquid level of the adhesive inside the resin storage tank 8.

A reading of a vacuum pump 10 is converted into an absolute pressure, and then the average pressure at the adhesive injection port is subtracted from the absolute pressure, such that the equivalent pressure drop of a mixing space formed by the reinforcing material (the reinforcing material forms a protective coating together with the cured adhesive, which is not shown in the figure, but does not affect the understanding of the technical solution) and the magnet steels at a flow stage of the adhesive during injection of the adhesive is obtained. A gap between the reinforcing material (such as fiberglass cloth or glass fiber), the magnet steel and the magnet yoke wall also forms an adhesive-filled gap. After a region, from a lower end to a position at two thirds of the height of the rotor, of the rotor is filled with the adhesive, the difference between a pressure inside the upper region and a pressure outside the upper region just approaches a reading of a vacuum gauge of the vacuum pump 10 under the action of the vacuum pressure difference. However, in a region from the lower end to a position at one third of the height of the rotor, the smaller the distance from the region to the adhesive injection port is, the smaller the difference between the pressure inside this region and the pressure outside this region and the pressure difference of the upper region's at a later stage during the injection of the adhesive is, and the pressure of an outer surface, corresponding to this region, of the vacuum bag 7 against the reinforcing material such as a fiberglass cloth is lower than the pressure of an outer surface, corresponding to the upper region, of the vacuum bag 7 against the reinforcing material such as a fiberglass cloth.

When the adhesive is injection-molded from bottom to top with vacuum assistance, under the gravity of the adhesive (resin) and under a negative pressure being created by the vacuum pump 10 at a suction inlet and a driving-force pressure difference formed at the adhesive injection port, the adhesive flows upward from a lowest end of a magnetic pole, at the same time, the adhesive radially penetrates and radially impregnates the reinforcing material, and radially seeps through the gap between the magnet steels, the gap between the magnet steel and the batten, and a gap between the magnet steel and a magnet steel plug.

For further study on the above issue, a test in which the adhesive is injected from top to bottom is further conducted in the present application. It is found through the test that when the adhesive is injected from the upper end to the lower end of the magnetic pole of the motor rotor with vacuum assistance, the direction of the gravity of the adhesive (resin) is same with a direction of the driving-force pressure difference formed at the adhesive injection port. Similarly, when the adhesive flows downward from a highest end of the magnet steel, the adhesive radially penetrates and radially impregnates the reinforcing material, and radially seeps through the gap between the magnet steels, the gap between the magnet steel and the batten and the gap between the magnet steel and the magnet steel plug. In this case, with the radial seepage and radial impregnation of the reinforcing material, radial seepage through the gap between the magnet steels is reduced, and the effect of radial seepage of the adhesive is weaken under the action of gravity self-sagging and gravity flow-guide, which is worse for filling the gap between the magnet steel and the magnet yoke wall with the adhesive.

The reinforcement materials such as a fiberglass cloth carry a lot of air and water vapor before use (it is to be particularly noted that attached water may gasify at a temperature of 43 degrees Celsius under vacuum, thus, it is required to heat to help desorption for removing the absorbed moisture). Woven fiberglass cloth is a porous material, and carries moisture in the wet air before use, and has a three-dimensional net structure which provides a condition for trapping the wet air during infiltration of the adhesive. The wet air is heated to gasify and squeezed out into the bubble during evacuation which is equivalent to pressurization. The woven fiberglass cloth is a porous material and has a three-dimensional network structure which also provides a necessary condition for gasification of water vapor. In particular, air and water vapor are absorbed in the gap between the magnet steels, the gap between the magnet steel and the batten and the gap between the magnet steel and the magnet steel plug as described above, and water may be cured be a sizing material having an isocyanate group with release of carbon dioxide, which forms foamed polymer.

Figure 3:
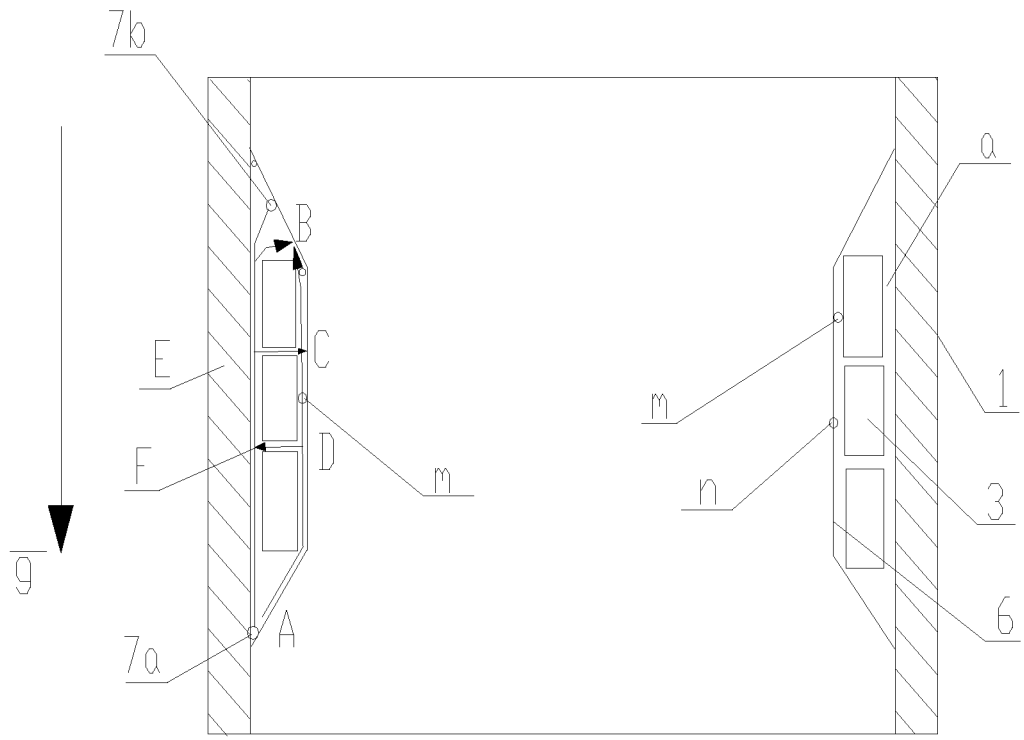
FIG. 3 is a schematic view showing a flow path of an adhesive during injection of the adhesive into a motor rotor in the conventional technology.

Through a large number of tests, it is found in the present application that, when the motor rotor is placed vertically and statically for being performed vacuum assisted injection molding in the conventional technology, a flow trace of the adhesive in the protective system obeys a certain law. Reference is made to FIG. 3, which shows the flow trace of the adhesive (i.e., the flow path of fluid micelles). It may be seen from FIG. 3 that, the adhesive in the gap a between the magnet yoke wall and the magnet steel, in some circumferential regions, presents the speed of an axial flow of the adhesive is greater than the speed of the adhesive flow between the reinforcing material and a film of the vacuum bag in a radial direction of the magnet steel in the circumferential distribution, and the adhesive axially flows along the gap, and the adhesive firstly overflows a gap between an uppermost magnet steel and a magnetic yoke. That is, the adhesive flows along a path A-F-E-B; whether the adhesive seeps between a spatial position E and a spatial position C and between a spatial position F and a spatial position D and whether the adhesive passes through the gap between the magnet steels cannot be controlled.

A direction of the gravity of the adhesive itself is perpendicular to a direction of adhesive radial impregnation of the magnet steel 3 of the motor rotor. The pressure for radial seepage comes from a radial pressure of the vacuum bag 7 against the protective system. When the vacuum bag 7 is compressed against the protective system tightly, the pressure is transmitted to a surface of the magnet steel. When the volume occupied by the protective system is stopped being reduced, the radial pressure is completely balanced by the magnet steel 3 in a radial direction of the motor rotor. The adhesive passing through the gap between the magnet steels causes a driving force for driving the adhesive into a clearance in the magnet steels and into a spatial region E and a spatial region F to disappear. Since the E and F spatial regions are firstly filled with the adhesive, the adhesive fills a gap between the space E and the space F, which causes the pressure for driving the adhesive to flow to "disappear" at a later stage during radial seepage (from the region C to the region E, from the region D to the region F) of the adhesive of the protective system, thus, filling the gap between the magnet steels with the adhesive cannot be ensured.

The adhesive in the gap between the magnet yoke wall and the magnet steel, in some circumferential regions, presents the speed of an axial flow of the adhesive is lower than the speed of the adhesive flow between the reinforcing material and the film of the vacuum bag in the radial direction of the magnet steel in the circumferential distribution, the adhesive axially flows along a flow guide net and the magnetic pole of the motor, and the adhesive first overflows an uppermost region of the magnet steel. That is, the adhesive flows along a path A-D-C-B; gaps extending in directions along the space positions A, F, E are not filled with the adhesive, and whether the adhesive seeps and passes through the gap between the magnet steels between the region C and the region E and between the region D and the region F, it is required to wait for the remaining mass flow of the adhesive to fill the gap between the magnet steels after the adhesive seeps, impregnates and passes through the composite protective layer. The direction of the gravity of the adhesive itself is perpendicular to a direction of the adhesive radial impregnation of the magnet steel of the motor rotor; the pressure for radial seepage comes from the radial pressure of the vacuum bag against the protective system. After the vacuum bag 7 is gradually compressed against the protective system tightly, less adhesive enters the vacuum bag 7 to flow in an axial direction of the motor until the adhesive stagnates, the radial pressure is transmitted to a surface of the magnet steel. When no adhesive is supplemented and the pressure is transferred to the surface of the magnet steel 3, and the volume occupied by the protective system is stopped being reduced, the radial pressure is completely balanced by the magnet steel in the radial direction of the motor rotor. The adhesive passing through the gap between the magnet steels causes the driving force for driving the adhesive into clearance in the magnet steels and into the spatial region E and the spatial region F to disappear. The adhesive first seeps the positions A, D, C, B on a surface of the flow guide net, which cuts off a driving force for the adhesive to continue flowing axially along the gap between the magnet steel and the magnet yoke wall. Therefore, it cannot be known whether any adhesive is continued to be supplemented into the gap, the spatial regions E and F, and the source of the driving force (the pressure difference) for the mass flow disappears. Due to the radial seepage (from the region C to the region E, from the region D to the region F) of the adhesive of the protective system, thus, completely filling the gap between the magnet steel and the magnet yoke wall with the adhesive cannot be ensured at a later stage.

Bubbles m are easy to be formed inside the protective coating, and vacancies n are easy to be generated on a surface of the protective coating, and reference may be made to FIG. 3.

Figure 4:
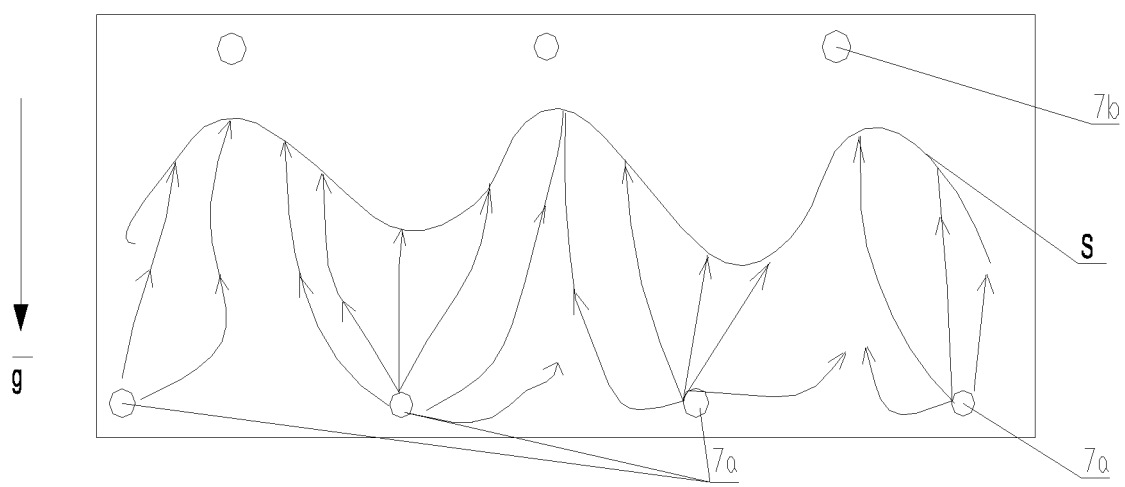
FIG. 4 is a schematic view showing a flow front trace of an adhesive at a moment when a vacuum bag is in a circumferentially unfolded state in the conventional technology.
Figure 5:
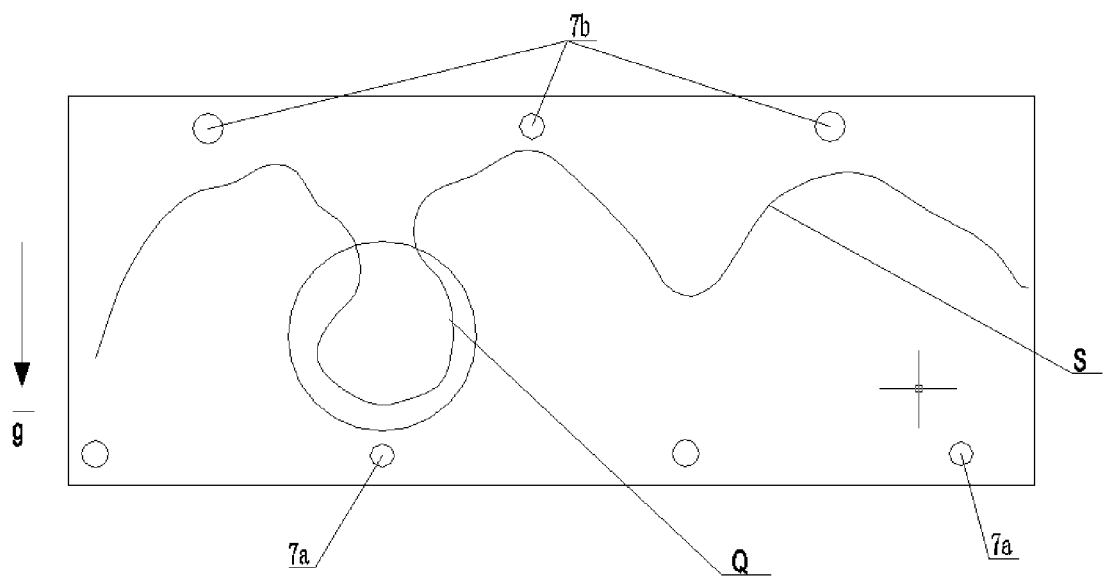
FIG. 5 is a schematic view showing a flow front trace of the adhesive at another moment when a vacuum bag is in a circumferentially unfolded state in the conventional technology.
Figure 6:
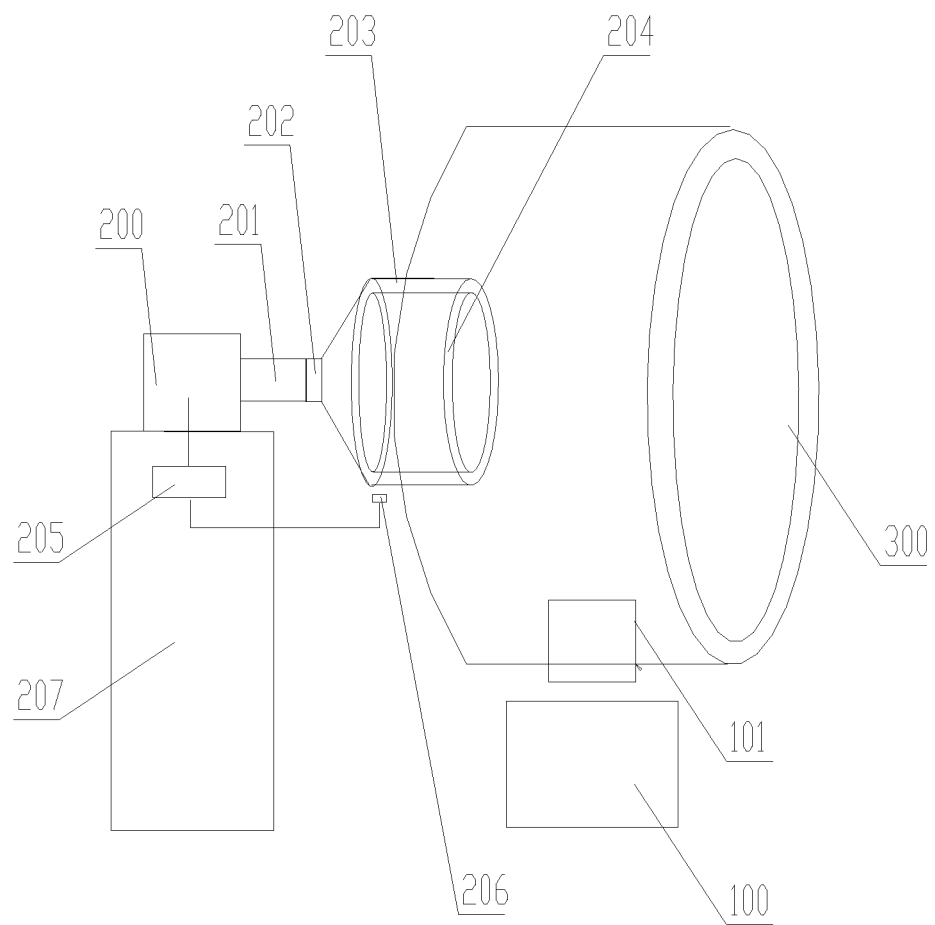
FIG. 6 is a partial schematic view of a process apparatus according to an embodiment of the present application.
Figure 7:
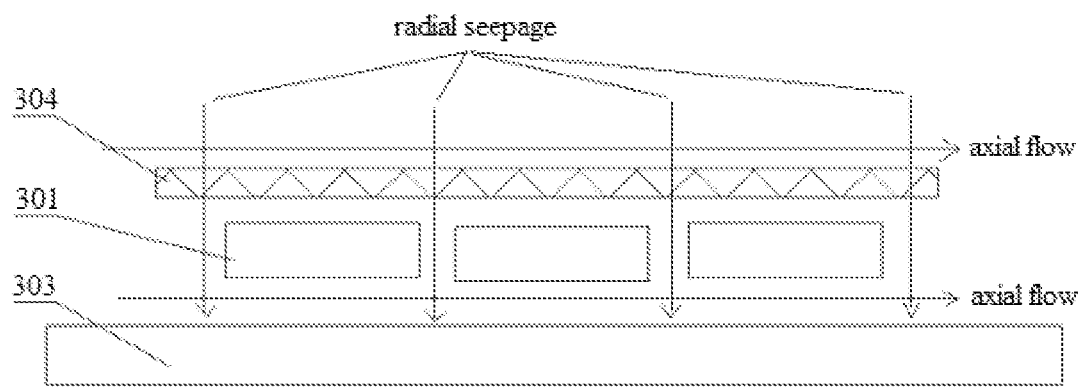
FIG. 7 is a schematic view showing a flow path of the adhesive according to the embodiment of the present application.

Based on the above research, the reason of presenting the bubbles and the vacancies in the conventional technology protective coating is further studied in the embodiment of the present application. Reference is made to FIG. 4 and FIG. 5 which respectively show flow front traces of the adhesive at two different moments.

As shown in FIG. 4, the flow front trace of the adhesive and an envelope curve S formed by a flow front of the adhesive at an instant during the vacuum adhesive injection in the case that the conventional technology is adopted are shown in a development view of the rotor of the permanent magnet motor and the magnet pole when being developed on a plane. At the same time, common phenomena that the adhesive axially flow in a local region and flows slowly upward from a lower end of the magnetic pole of the rotor and that the axial flow of the adhesive is cut off by convergence of the adhesive at two sides of the local region, as shown in FIG. 5, that is, no adhesive flows through a subregion "a" yet after the flow fronts at two sides of the local region converge. Certainly, existence of such a region is the most unfavorable inherent phenomenon for the radial flow of the adhesive, the fully impregnating the protective layer with the adhesive, filling the gap between the magnet steels with the adhesive and filling the gap between the magnet steel and the magnet yoke wall with the adhesive.

In FIGS. 4 and 5, four input ports 7a and three output ports 7b are shown at a lower circumferential end of the magnet yoke wall. In the process shown in the figures, it is omitted that, the adhesive axially flows along the flow guide net under the film of the vacuum bag by providing a flow guide member in a shape of a coil spring between the adjacent input ports 7a. However, due to the large resistance to the radial seepage, it takes a certain duration to seep, and the certain duration is much greater than the duration of the axial vacuum adhesive injection. Therefore, during the vacuum adhesive injection, it may be seen that the adhesive flows under the vacuum bag 7 and that the adhesive covers the entire surface of the magnet steel 3. However, this phenomenon does not represent that impregnation of the reinforcing material (fiber cloth or fiberglass cloth) with the adhesive is ended, and does not mean that filling the gaps between the magnet steels with the adhesive is completed.

Based on the above research, a technical solution which may reduce the residual bubbles in the protective coating and improve the forming quality of the protective coating is provided according to the embodiment of the present application, which is described in detail hereinafter.

In order to make the person skilled in the art have a better understanding of the technical solution of the present application, the present application is described hereinafter in further detail in conjunction with the process, a process apparatus required for the process, the drawings and the embodiments.

Referring to FIG. 6 to FIG. 9, for the shape, the structure and the function of each of a magnetic pole component 301 and a batten (not shown in the Figure), reference may be made to the description of the corresponding components such as the magnet steel and the batten in the background. In general, before a process for forming the protective coating for the permanent magnet motor is performed, pre-processed components, such as a magnet yoke wall 303, the magnetic pole component 301, the batten and the reinforcing material 304, are placed in the respective storage spaces, and before assembly, the components are required to be respectively transported to the corresponding assembly stations in a workshop. Specifically, it is preferable that the components are stored at a certain temperature and at certain humidity. The temperature and the humidity are set according to the materials of the magnet yoke wall 303, the magnetic pole component 301, the reinforcing material 304 and the batten. A suitable temperature and suitable humidity may be selected by the person skilled in the art according to the materials of the magnet yoke wall 303, the magnetic pole component 301, the reinforcing material 304 and the batten, so as to allow the above components to be in a better storage condition.

In order to accurately know the storage condition of each of the components, a temperature sensor and a humidity sensor may be provided in a storage space for respectively detecting the temperature and the humidity of each of the storage spaces where the magnet yoke wall 303, the magnetic pole component 301, the reinforcing material 304 and the batten are located. Of course, the temperature sensor and the humidity sensor may be further connected to a controller. The controller may be further configured to display a detection signal of the temperature sensor and a detection signal of the humidity sensor on a display interface, so as to facilitate the staff monitoring the conditions of the storage spaces of the components in real time.

In addition, in a specific embodiment, in an optimum assembly condition for the components, an operation space where the assembly stations are located is generally at a temperature ranging from 15 degrees Celsius to 22 degrees Celsius and at a relative humidity maintained below 10%. Therefore, in this embodiment, the temperature and the humidity of the operation space where the assembly stations are located may be further measured. When the relative humidity of the operation space where the assembly stations are located is greater than 10%, an outer wall of the magnet yoke wall 303 is heated and a surface of the magnet yoke wall 303 is maintained at a relative humidity not less than 20%. According to a "wet air psychrometric chart", the magnet yoke wall is limited at a temperature lower than 50 degrees Celsius.

The above is one of the improvements to the operation space of the assembly stations according to the present application.

Figure 10:
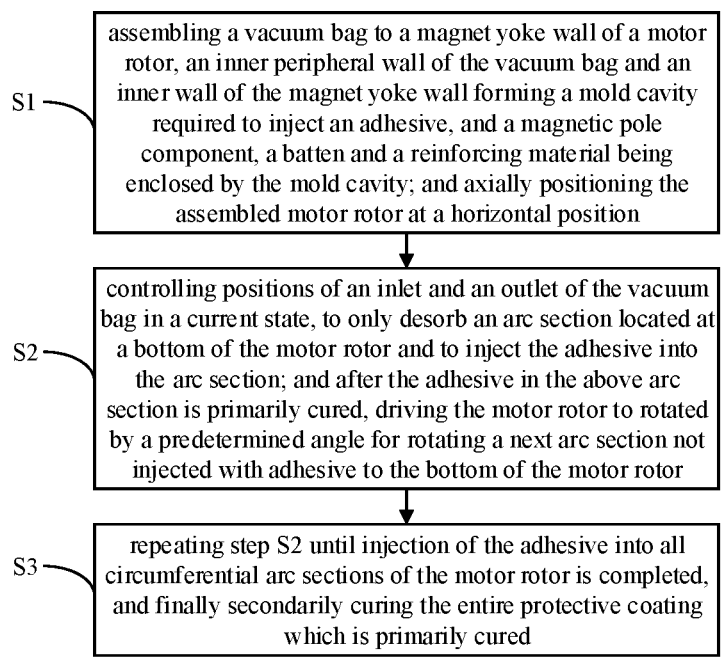
FIG. 10 is a flow chart of a process for forming the protective coating for the magnetic pole of the permanent magnet motor according to the present application.

Referring to FIG. 10, a process for forming the protective coating for the magnetic pole of the permanent magnet motor is provided according to the embodiment of the present application, which includes the following steps S1, S2 and S3.

In step S1, the vacuum bag is assembled to the magnet yoke wall 303 of the motor rotor. An inner peripheral wall of the vacuum bag 501 and an inner wall of the magnet yoke wall form a mold cavity required for injection of the adhesive. The magnetic pole component 301, the batten and the reinforcing material 304 are enclosed by the mold cavity. The motor rotor that is assembled is axially positioned at a horizontal position.

The motor rotor may be positioned by the process apparatus at the horizontal position. That is, the process apparatus includes a positioning component for axially positioning the assembled motor rotor at the horizontal position.

Figure 8:
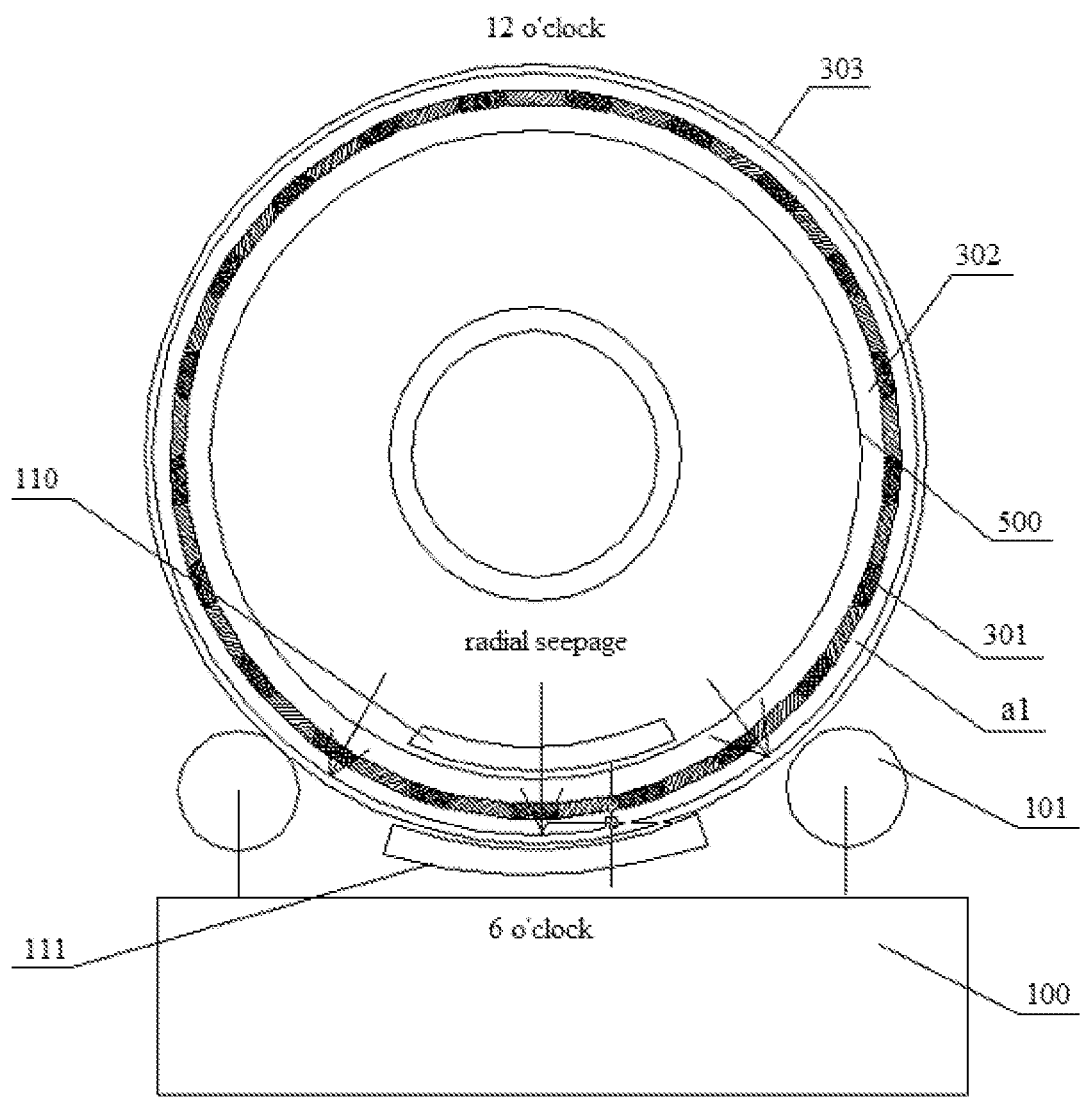
FIG. 8 is an axial schematic view of a motor rotor mounted to the process apparatus for being injected with the adhesive according to the embodiment of the present application.
Figure 9:
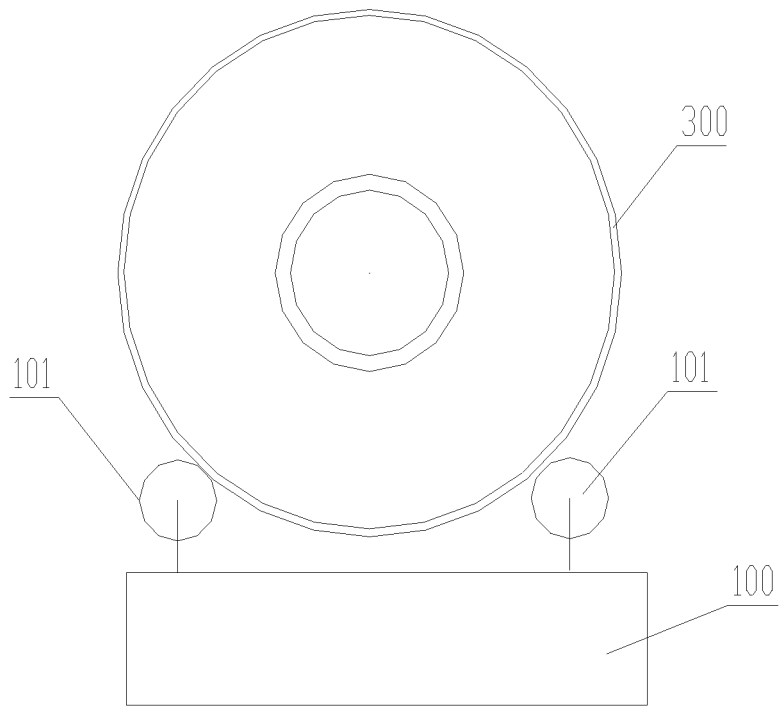
FIG. 9 is an axial schematic view of FIG. 6.

Specifically, referring to FIG. 8 and FIG. 9, the positioning component may include a support platform 100. At least two rollers 101 are provided on the support platform 100. An outer sidewall of a motor rotor 300 is supported on the support platform 100 via the rollers 101. An outer surface of the roller 101 may also be provided with an elastic layer, so as to prevent an outer wall of the motor rotor 300 from being worn. Of course, the positioning component may also be in other forms, for example in the form of a clamp, as long as the motor rotor is horizontally positioned in a reliable manner.

Of course, it is possible to assemble the vacuum bag 501 to the magnet yoke wall of the motor rotor 300 after the motor rotor 300 is positioned at the horizontal position.

In step S2, the positions of an inlet 501a and an outlet 501b of the vacuum bag 501 are controlled to only desorb an arc section of the motor rotor located at a bottom of the motor rotor and to inject the adhesive into the arc section. After the adhesive in the above arc section is primarily cured, the motor rotor is driven to rotate by a predetermined angle for rotating the next arc section which is not injected with the adhesive to the bottom of the motor rotor.

Typically, an extreme bottom of the motor rotor is defined as a six o'clock position. Two sides symmetrical about the six o'clock position may be selected as the bottom arc section, for example, an arc section from a five o'clock position to a seven o'clock position is selected as the bottom arc section. That is, during one adhesive injection, only the arc section between the five o'clock position and the seven o'clock position is injected, and other sections in the vacuum bag 501 are not injected with the adhesive.

Typically, the length of the bottom arc section may be reasonably determined based on a diameter of the motor rotor and injection conditions. A reasonable control on the bottom arc section may be achieved by control of the operation state of each of an adhesive injection inlet and an adhesive injection outlet of the vacuum bag 501. It should be noted that, in the embodiment of the present application, an inlet communicated with an external adhesive injection pipeline is defined to be in an active state and an inlet discommunicated from the external adhesive injection pipeline is defined to be in an inactive state. Similarly, in the embodiment of the present application, an outlet of the vacuum bag 501 communicated to a vacuum pump is defined to be in an active state. Conversely, an outlet discommunicated from the vacuum pump is defined to be in an inactive state. By controlling the operation state of each of the inlets and the outlets of the vacuum bag 501, it is possible to inject the adhesive to only an arc section located at a bottom of the vacuum bag 501.

Specifically, the inlets and the outlets of the vacuum bag 501 may be communicated with the adhesive injection pipeline and the vacuum pump through corresponding on-off valves. In this way, the inlets and the outlets are respectively communicated with and discommunicated from the adhesive injection pipeline and the vacuum pump by controlling on and off of the on-off valve.

The on-off valve may be an electrically controlled valve, such as an electromagnetic valve, which facilitates automatic control of the adhesive injection. Of course, the on-off valve may also be a manually controlled valve.

Specifically, the desorption may be divided into physical desorption and chemical desorption. The physical desorption refers to purging a solid surface to be adhered to with hot air or to heating the solid surface to be adhered to for depressurization. The chemical desorption refers to cleaning up impurities on the solid surface to be adhered to by using a chemical substance. The present application is described in detail by taking the physical desorption as an example, and based on this, the technical solution is further described.

Three desorption processes are mainly described herein. A first desorption process is to evacuate an interior of the vacuum bag 501. A second desorption process is to communicate the inlets of the vacuum bag 501 to a high-pressure hot air source and to communicate the outlets of the vacuum bag 501 to a low-pressure circuit so as to pass dry and clean hot air into the interior of the vacuum bag 501. A third desorption process is that the components and parts inside the mold cavity are heated by an electromagnetically induced eddy current, while an interior of the mold cavity is evacuated or dry and clean air flow is passed into the interior of the mold cavity.

In the process that the dry and clean hot air is passed into the interior of the mold cavity, the following steps are conducted simultaneously: the temperature and the humidity of the surface of each of the batten, the magnetic pole component 301 and the magnet yoke wall as well as the known mass of the magnetic pole component 301 are detected, and according to the temperature, the humidity and the mass that are detected, a predetermined duration for passing the dry and clean hot air into the interior of the mold cavity is determined.

Regardless of the process of physical desorption or chemical desorption, the adsorption amount of gas may decrease as the temperature increases, and the pressure is lowered, and both the adsorption amount and the adsorption rate decrease. The outlets of the vacuum bag 501 are connected to the vacuum pump. The adhesive injection port may also be communicated with the hot air source. The hot air which is filtered, dried and dehumidified is continuously suctioned through the adhesive injection port, solid wall surfaces (the magnet yoke wall, the magnetic pole component 301, the reinforcing material 304, and the batten) inside the mold cavity are dried to be "desorbed" in a manner of heat transfer and mass transfer. Since both the chemical adsorption process and the physical adsorption process are spontaneous processes, the Gibbs free energy decreases (G<0) during each of the chemical adsorption process and the physical adsorption process. When the gaseous molecules of the hot air adsorb on a solid surface, the movement of the gaseous molecules is limited to two-dimensional movement on a surface layer from free movement in an original space, which reduces the degrees of freedom of movement, thus the entropy is also reduced (S<0). According to a basic relation of thermodynamics: G=H−T*S, it may be derived that H<0. Thus, the gaseous molecules of the hot air adsorb on the solid wall surfaces (the magnet yoke wall, the magnetic pole component 301, the reinforcing material 304 and the batten) and take the absorbed substances away, and then continuously release heat to the solid wall surfaces. The temperature of each of the solid wall surface is increased, and the surface tension is reduced correspondingly.

Figure 11:
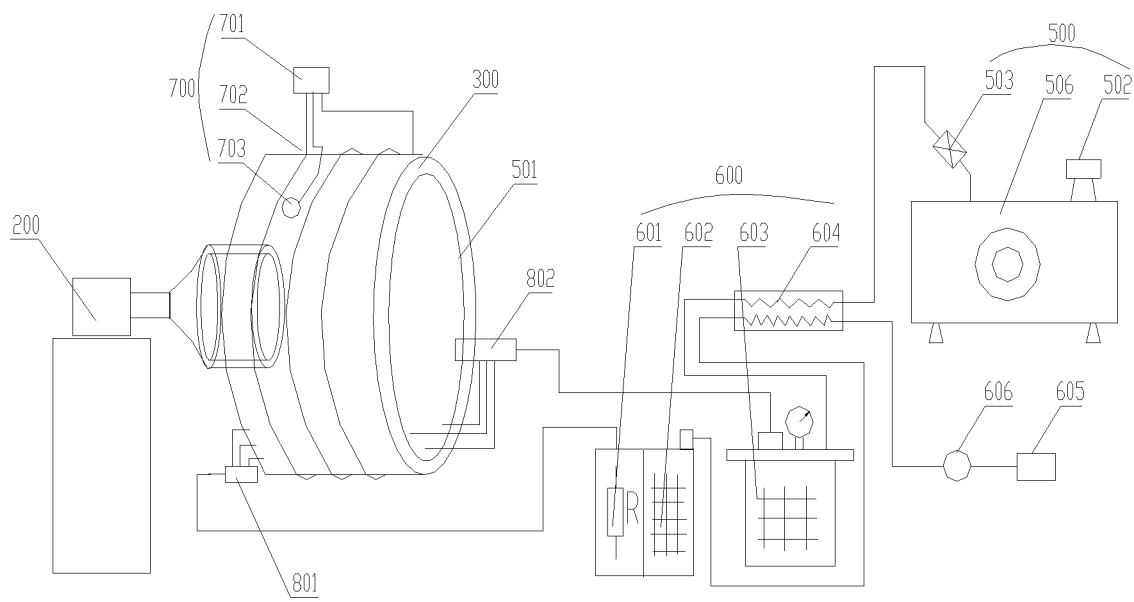
FIG. 11 is a schematic view showing the structure of components of the process apparatus connected to one another when the motor rotor is in a desorbed state according to the embodiment of the present application.

Referring to FIG. 11, the process apparatus further includes a desorption assembly 600. The desorption assembly 600 includes a gas source 605, a heater 601 and an on-off valve 606. An outlet of the gas source 605 is communicated with the inlets of the vacuum bag 501. The heater 601 is provided at a communication pipeline communicating the gas source 605 with the inlets of the vacuum bag 501, for heating the gas flowing into the vacuum bag 501. The on-off valve 606 is provided at an outlet of the gas source 605, for controlling opening and closing of the pipeline between the gas source 605 and the vacuum bag 501. In desorbing, under the action of a vacuum pump 506, the gas in the gas source 605 may enter into the mold cavity of the vacuum bag 501.

Accordingly, the process apparatus further has a controller (not shown in the figure). The controller pre-stores a desorption control module. The desorption control module determines the duration of passage of the dry and clean hot air from the gas source into the interior of the mold cavity based on signals from a temperature sensor and a humidity sensor, which are mounted inside the vacuum bag 501, and the quality of the magnetic pole component.

The gas source 605 may provide the dry and clean hot air required for the desorption. The clean hot air, which is filtered, dried and heated, may be used to drive the surface to be adhered to, thus, the surface condition of a region, which has a weak interaction with the dry and clean hot air, of the surface of the solid matter is improved, the temperature and the dryness are increased, and the absorption amount of the solid surface is reduced. It is especially necessary to remove the water vapor molecules, for creating a good wetting condition after the mold cavity is injected with the adhesive and for providing a precondition for the chemical absorption performed after the adhesive injection. The viscosity of the prepared polymer adhesive may be reduced when heated by a high adherend surface and then good fluidity is obtained, thus the seepage speed is controlled, the adhered adsorbate (gas, impurities, etc.) is driven away, which facilitates the adhesive being firmly bonded to the solid surface during subsequent adhesive injection, thus, detachment of the protective coating 302 from the interface during subsequent use is avoided, the magnetic pole component 301 and other components are protected, and the operation reliability of the motor is increased.

In the embodiment of the present application, the relative humidity of the gas in the gas source is required to be less than or equal to 10%, the temperature of the hot air is greater than the temperature of the assembly space by 5 degrees Celsius to 10 degrees Celsius, and the vacuum degree in the mold cavity is maintained at 98 kPa to 99 kPa.

According to the mass of the magnetic pole component 301, the passage duration, the flow rate and the temperature of the hot airflow for the "desorption" process are determined in preparation for the adhesive injection. During the dry and clean hot air is passed into the interior of the mold cavity, the following steps are performed simultaneously: the temperature and the humidity of a solid surface to be adhered to such as the batten, the magnetic pole component 301 and the magnet yoke wall as well as the mass of the magnetic pole component 301 are detected, and according to the temperature, the humidity as well as the mass of the mass detected, a time duration for passing the dry and clean hot air into the interior of the mold cavity is determined. The temperature signal and the humidity signal described above may be detected by a temperature sensor and a humidity sensor. In a specific desorption process for the permanent magnet motor, hot air is passed for a desorption time duration about 30 minutes, and then the mold cavity is evacuated for approximately 30 minutes, finally, subsequent evacuation process step is performed.

In order to remove the impurities such as water vapor on the solid surface of the mold cavity as much as possible, the pressure inside the mold cavity may also be controlled to gradually increase during the desorption. If the pressure on the solid surface of the mold cavity is large, the surface tension is small, which facilitates removing the impurities.

Accordingly, the desorption assembly 600 may further include an inlet filtering component 602 and an outlet filtering component 603 for respectively filtering the gas entering the vacuum bag 501 and filtering the gas flowing out of the vacuum bag 501.

If the hot air for desorption is directly discharged, heat loss may be caused. In order to increase the utilization ratio of heat, the process apparatus according to an embodiment of the present application is further provided with a heat exchanger 604. The heat exchanger 604 may be a wall division type heat exchanger. In desorbing, heat is transferred between gas in a gas inlet main pipeline communicated with the vacuum bag 501 and gas in a gas outlet main pipeline communicated with the vacuum bag 501 through the heat exchanger.

In this way, a part of the heat of the hot air flowing out of the vacuum bag 501 may be transferred to the air entering the vacuum bag 501, thus the air is heated before entering the vacuum bag 50, and the temperature of the air is to further increased, thereby improving the desorption effect.

Figure 12:
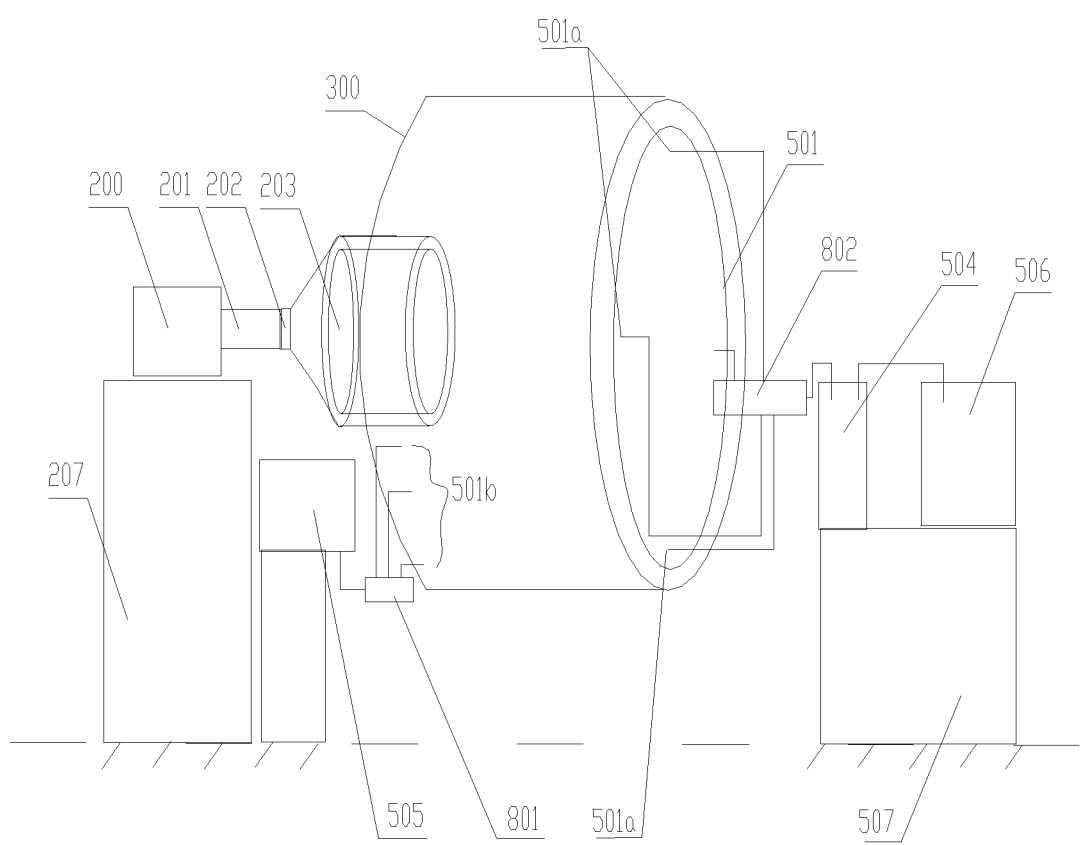
FIG. 12 is a schematic view of the components of the process apparatus connected to one another when the motor rotor is in a state of being injected with the adhesive according to the embodiment of the present application.

After desorption, the vacuum bag is injected with the adhesive. Referring to FIG. 12, the process apparatus correspondingly includes an adhesive injection assembly 500. The arc section located at the bottom of the motor rotor 300 is desorbed and the adhesive is injected into the arc section. The adhesive injection assembly 500 preferably includes a vacuum pump drive motor 502, a vacuum pump control valve 503, an adhesive collector 504, an adhesive storage tank 505, the vacuum pump 506 and other components. According to the test requirements, other components such as a seat 507 for supporting the vacuum pump 506 may be provided.

In order to completely fill the gap between the magnet steel and the magnet yoke wall and the gap between the magnet steel and a magnet steel layer with the adhesive, the adhesive may be vibrated while being injected.

Figure 13:
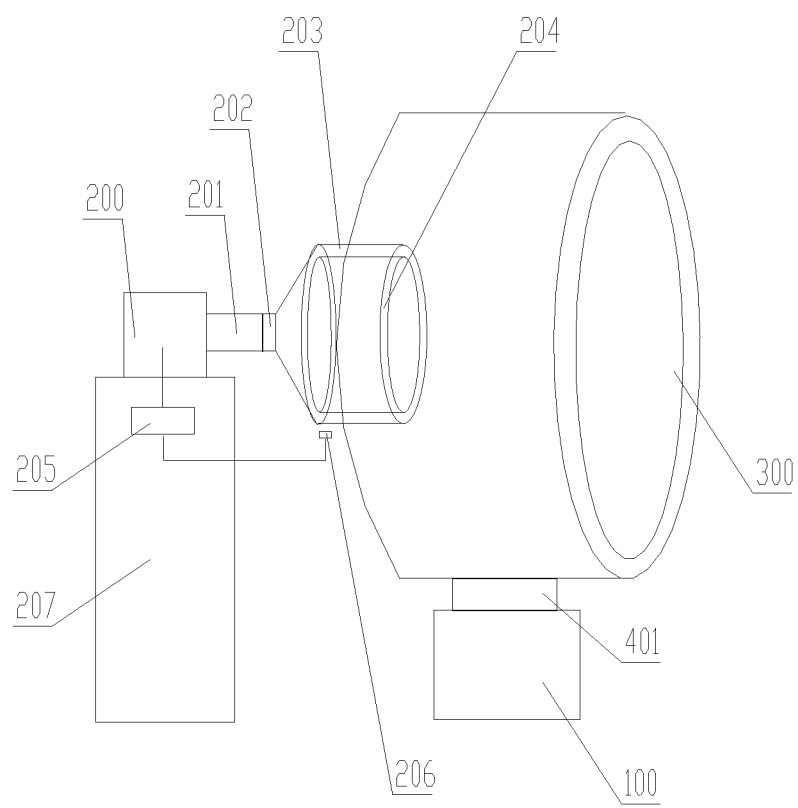
FIG. 13 is a schematic view showing the structure of a first vibration component mounted to the process apparatus according to the embodiment of the present application.
Figure 14:
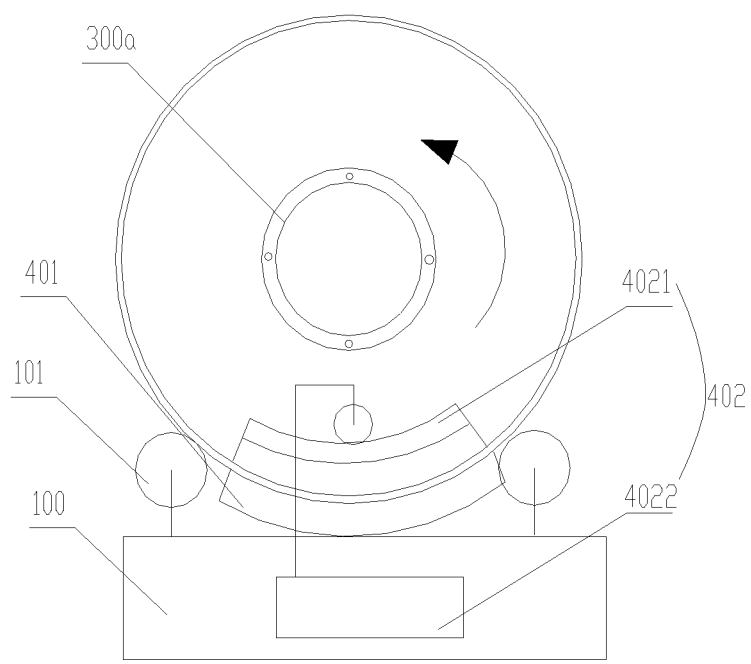
FIG. 14 is an axial schematic view showing assembly of the process apparatus, mounted with the first vibration component and a second vibration component, to the motor rotor according to the embodiment of the present application.
Figure 15:
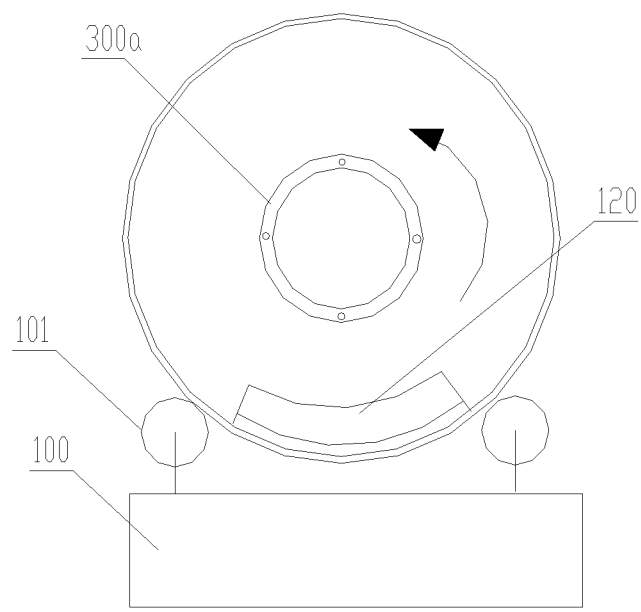
FIG. 15 is an axial schematic view of the process apparatus when the adhesive in a bottom arc section is primarily cured according to the embodiment of the present application.

Referring to FIG. 13 to FIG. 15, the process apparatus according to each of the above embodiments may be further provided with a vibration component, which may apply vibration to the adhesive inside the arc section located at the bottom of the motor rotor. The vibration component may take multiple forms, as long as the function of the vibration component described above is realized. Multiple implementations of the vibration component are provided according to the embodiment of the present application.

In a specific embodiment, referring to FIG. 13 and FIG. 14, the vibration component may include a first vibration component 401 located at an outer side of the motor rotor. The first vibration component 401 may be in contact with the outer wall of the motor rotor, or may not be in contact with the outer wall of the motor rotor. The first vibration component 401 may be an ultrasonic vibration excitation device. The ultrasonic vibration excitation device emits ultrasonic waves to the outer wall of the motor rotor for vibrating the outer wall of the motor rotor, thus the adhesive inside the vacuum bag 501 is driven to vibrate. The vibration of the adhesive facilitates rapid seepage of the adhesive in the direction of gravity, so as to completely fill the gap between the magnet steel and the magnet yoke wall and the gap between the magnet steel and the magnet steel layer with the adhesive.

Furthermore, referring to FIG. 14 again, the vibration component may further include an ultrasonic generator 4022 and a horn type radiation emitter 4021. The horn type radiation emitter 4021 is located at an outer side of the vacuum bag 501 and has an emission opening facing the arc section located at the bottom of the motor rotor. The sonic waves from the ultrasonic generator 4022 directly act on an outer surface of the vacuum bag 501, which facilitates downward injection of the adhesive.

Due to the arc-shaped structure, the adhesive at two sides of the bottom arc section inevitably tends to converge toward a middle position during the injection. Therefore, in order to obtain the thickness uniformity of an adhesive layer, the embodiment of the present application is further implemented in the following manner.

In order to reduce the influence of vibration on a connecting shaft of a drive component as much as possible, the process apparatus further includes the following components.

Furthermore, referring to FIG. 13 again, a flexible coupling 202 and a transition joint 203 are provided successively between a drive shaft 201 of the drive component in the process apparatus and the motor rotor 300. The transition joint 203 includes a large end cooperatively connected to a flange 204 of the motor rotor and a small end cooperatively connected to a power output end of the flexible coupling 202.

The flexible coupling 202 connects the drive shaft 201 and the transition joint 203. The flexible coupling 202 may transmit the movement and the torque and provide axial compensation, radial compensation and angular compensation to different extents, and may also damp the vibration to an extent, thereby improving the operation performance of the transmission system.

Moreover, the transition joint 203 may achieve transition and connection between a large-diameter rotating component and a small-diameter rotating component.

In order to achieve precise control, the process apparatus may further include a servomotor 205 and a servomotor sensor 206. The servomotor 205 and the servomotor sensor 206 may be supported on a base 207. The servomotor sensor 206 is used to detect the rotation angle of the transition joint 203. The servomotor 205 determines the rotation direction and the rotation angle according to a rotation angle signal detected by the servomotor sensor 206.

In each of the above embodiments, the thickness of the adhesive layer formed is also detected in real time during injection of the adhesive into the bottom arc section. If a difference between the thickness of the adhesive layer and a preset thickness is within a predetermined range, a control command for closing the inlet of the vacuum bag 501 is sent. The predetermined range refers to an error range determined according to actual production.

Accordingly, the process apparatus includes a device for measuring the thickness of the adhesive layer, referring to FIG. 14 again, the device for measuring the thickness of the adhesive specifically includes a power supply (not shown), an outer pole plate 111, an inner pole plate 110 and a processor (not shown). The inner pole plate 110 and the outer pole plate 111 are respectively connected to two electrodes of the power supply. The inner pole plate 110 and the outer pole plate 111 are respectively provided opposite to the inner wall of the vacuum bag 501 and the outer wall of the motor rotor, and the inner pole plate 110 and the outer pole plate 111 have shapes respectively matching the shapes of the inner wall and the outer wall, to which the inner pole plate 110 and the outer pole plate 111 are respectively opposite, of the motor rotor.

The processor determines the thickness of the adhesive layer based on the capacitance between the inner pole plate 110 and the outer pole plate 111.

The magnetic pole component 301, the magnet yoke wall and the reinforcing material 304 (such as a fiber material) are all solids, and the adhesive adsorbs only on a surface and a thin layer of each of these solids, which is actually an interfacial phenomenon. The property of a surface layer of each of these solids is completely different from the property of the interior of each of the solids, with the difference being even more pronounced after prolonged exposure. The surface of the solid (the magnetic pole component 301, the magnet yoke wall, the batten and the reinforcing material 304) includes adsorbed gas, adsorbed water film, oxides, grease, dust and the like, thus the surface of the solid is not clean. The surface energy of a component such as the magnetic pole component 301, the magnet yoke wall and the reinforcing material 304 is higher than the internal energy thereof, and a large amount of voids and cracks may further be formed in the surface of each of the magnetic pole component 301, the magnet yoke wall, the batten and the reinforcing material 304 due to oxidation, corrosion and so on, which is one of the reasons that micro-cracks exist at the interface after the adhesive is cured.

In step S3, step S2 is repeated until the adhesive is injected into all circumferential arc sections of the motor rotor, and finally the entire protective coating primarily cured is secondarily cured.

It should be noted that primary curing of the adhesive means that the adhesive loses the fluidity which makes the filled adhesive not to displace rather than be permanently cured.

Referring to FIG. 15 again, specifically, the process apparatus may include an ultraviolet radiation component 120. The ultraviolet radiation component 120 is located in an inner cavity of the motor rotor, and is provided opposite to an outer sidewall of the vacuum bag 501. A gap, preferably small, may exist between the outer sidewall of the vacuum bag 501 and the ultraviolet radiation component 120, or no gap exists therebetween. The ultraviolet radiation component 120 is used to primarily cure the adhesive at the bottom arc section.

As described above, the rotation of the motor rotor may be realized by the drive component 200 in the process apparatus. The drive component 200 may drive the motor rotor 300 to gradually rotate in a circumferential direction of the motor rotor, thus, the circumferential arc sections of the rotor are successively filled with the adhesive, that is, continuously filling of the arc sections is completed as the rotor rotates one revolution.

Of course, the arc sections filled with the adhesive may also be discontinuous, that is, a previous arc section filled with the adhesive is not adjacent to a next arc section to be filled with the adhesive.

In addition, in the process that the drive component 200 drives the motor rotor to rotate for circumferentially injecting the adhesive, the positions of the inlets 501*a* and the outlets 501*b* of the vacuum bag 501 constantly change. In order to reduce the damage, caused by the rotation of the motor rotor 300, to the pipelines communicated with the inlets 501*a* and the outlets 501*b*, as shown in FIG. 11 to FIG. 12, the process apparatus according to an embodiment of the present application further includes an inlet fluid slip ring 801 and an outlet fluid slip ring 802.

An inlet main pipeline for the gas or the adhesive is connected to the inlets of the vacuum bag 501 through the inlet fluid slip ring 801, and an outlet main pipeline for the gas or the adhesive is communicated with the outlets of the vacuum bag 501 through the outlet fluid slip ring 802.

In this way, during the rotation of the motor rotor, since the inlet fluid slip ring 801 and the outlet fluid slip ring 802 may rotate by 360 degrees, an issue of pipeline winding may be addressed. The fluid medium is split into multiple output branches after the fluid medium passes through the inlet fluid slip ring 801. Multiple output pipelines are respectively accessed to the corresponding inlets of the vacuum bag 501 for the motor rotor. The fluid medium is output from another end into the outlet fluid slip ring 802 in an axial direction of the vacuum bag 501. The multiple output branches of the fluid medium from the multiple output pipelines enter the outlet fluid slip ring 802 and then converge together.

That is, the inlet fluid slip ring 801 splits the flow and prevents the multiple pipelines from being accessed to the motor rotor 300 at different heights after splitting of the flow, thereby preventing the multiple pipelines from being wound around each other, being bent, being blocked and preventing the fluid medium from being held up in the multiple pipelines.

Similarly, the outlet fluid slip ring 802 converges the flow and prevents the multiple pipelines from being accessed to the gas slip ring at different heights before the flow is converged, thereby preventing the multiple pipelines from being wound around each other, being bent, being blocked and preventing the fluid medium from being held up in the multiple pipelines.

In each of the above embodiments, at the same that the vibration is applied, the arc section into which the adhesive is injected is driven to reciprocatingly swing, which allows two ends of the arc section to alternately swing to the six o'clock position and to stay at the six o'clock position for a predetermined time.

By taking the bottom arc section being a region from the five o'clock position to the seven o'clock position as an example, the five o'clock position and the seven o'clock position of the bottom arc section may alternately swing to the six o'clock position, and may stay at the six o'clock position for about five minutes, and rotates in an opposite direction back to the five o'clock position. Of course, the duration of stay at the six o'clock position is not limited to 5 minutes and may be set according to actual situations.

The secondary curing in the above step S3 specifically includes:

heating the adhesive injected into the interior of the vacuum bag 501 to increase the temperature of the adhesive, and controlling the temperature of the adhesive layer formed between the magnet yoke wall 303 and an inner sidewall of the vacuum bag 501 to be distributed symmetrically about a circumferential plane where a radial center between the magnet yoke wall 303 and an inner sidewall of the vacuum bag 501 is located.

Figure 16:
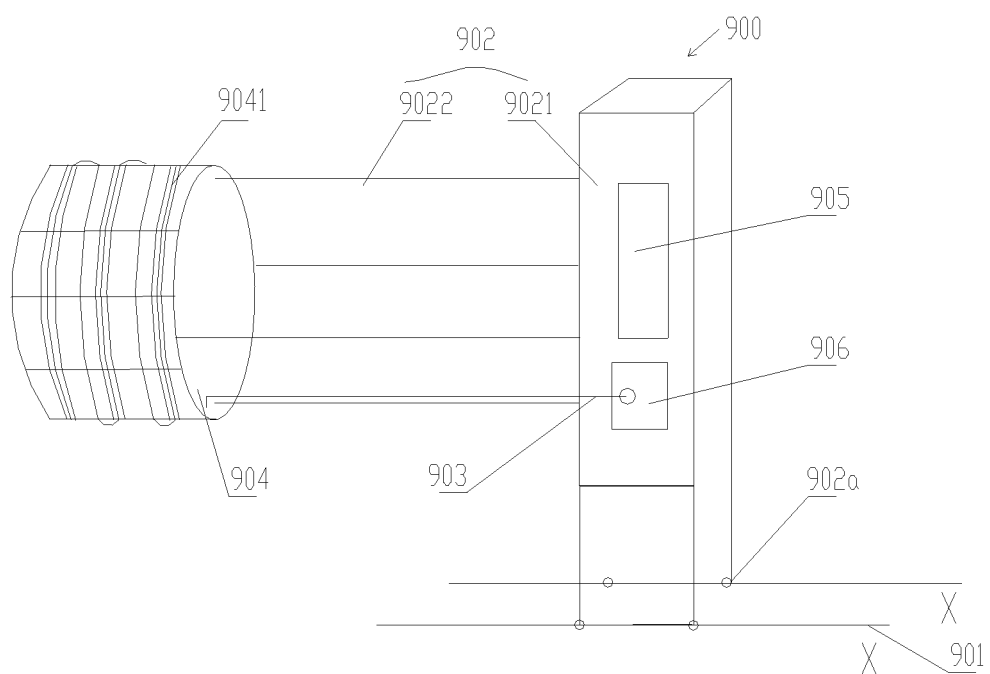
FIG. 16 is a schematic view showing the structure of an industrial robot according to the embodiment of the present application.
Figure 17:
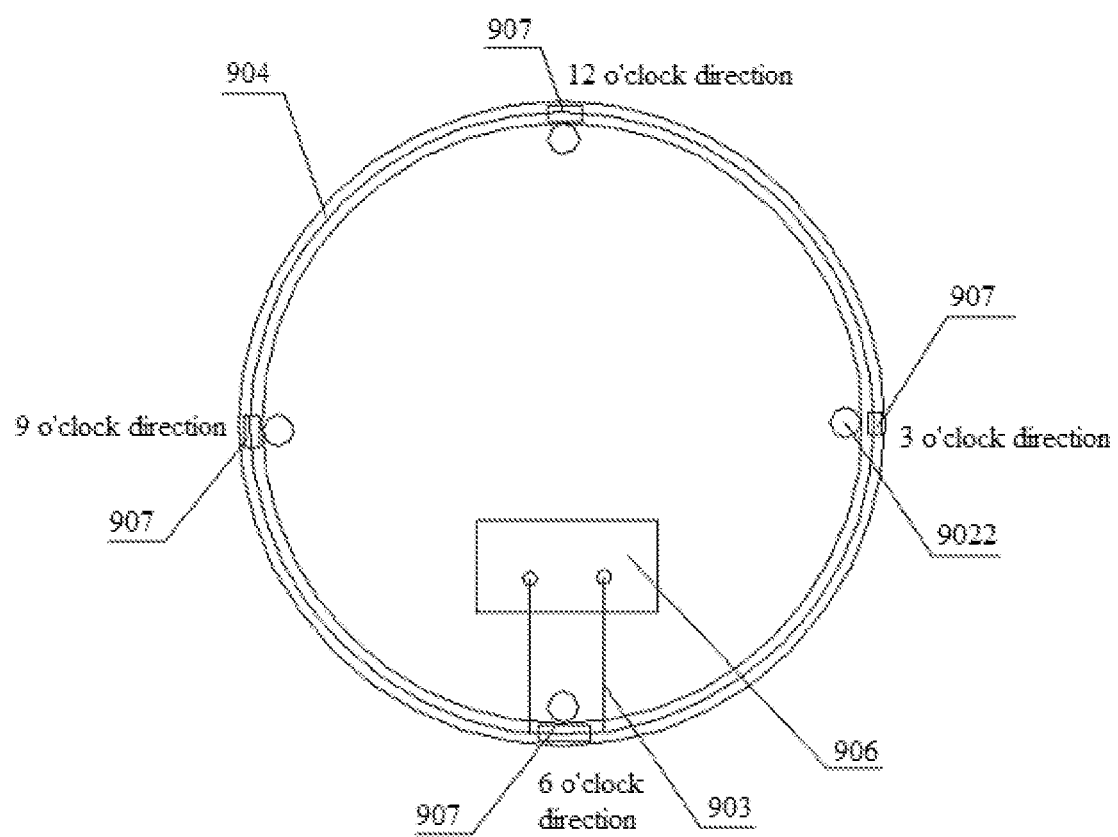
FIG. 17 is an axial schematic view of FIG. 16.
Figure 18:
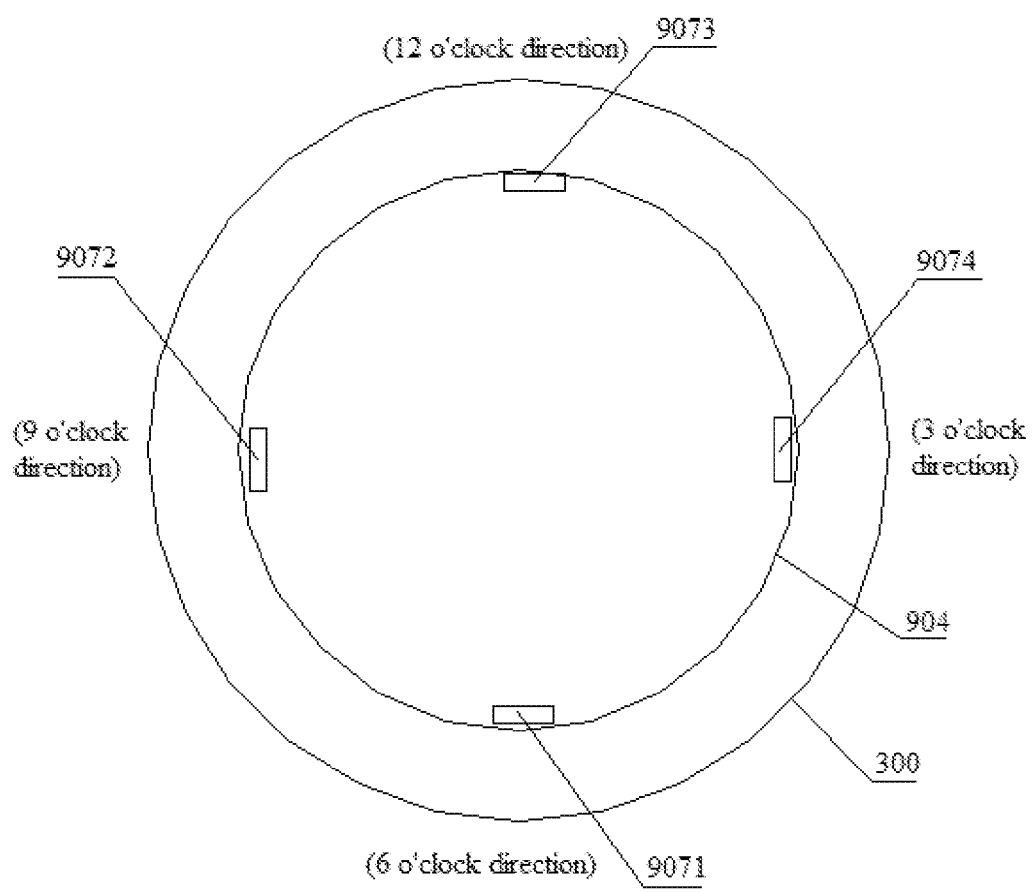
FIG. 18 is an axial view of a position detection component arranged on a coil bobbin according to the embodiment of the present application.

Referring to FIG. 16, in order to achieve the desorption, the primary curing and the secondary curing, the above process apparatus according to the present application further includes an industrial robot for heating, that is, a first heating device in the process apparatus described above may be the industrial robot. The industrial robot includes a moving main body 902. The moving main body 902 is provided with a position sensor (not shown in the figure), an electromagnetic coil assembly, a position detection component and a position and attitude controller (not shown in the figure).

A bottom of the moving main body 902 is provided with a running mechanism, and the running mechanism is configured to move along a preset track. The running mechanism may be in the form of a slider 902*a* and a slide track 901, that is, the bottom of the moving main body 902 is provided with the slider 902*a*. A slide rail 901 cooperating with the slider 902*a* is provided on a support base. The moving main body 902 may move along the slide rail 901 with respect to the support base. The specific structure of each of the slider 902*a* and the slide rail 901 is not specifically described herein, as long as the moving main body 902 may move with respect to the support base.

The position sensor is used to monitor a position signal of the running mechanism. The electromagnetic coil assembly includes an electromagnetic coil and a power supply, and the power supply is used to supply an alternating current to the electromagnetic coil. The position detection component is used to detect a position signal of the electromagnetic coil. The position and attitude controller controls the running mechanism to move along the preset track based on the position signal detected by the position sensor, so as to allow the running mechanism to move to a target position of a predetermined station. The position and attitude controller adjusts the attitude of the electromagnetic in real time based on the position signal detected by the position detection component to maintain a circumferential interval between an outer surface of the electromagnetic coil and a heated workpiece during the movement of the electromagnetic coil, thereby positioning the electromagnetic coil at a heating position of the heated workpiece.

For the motor rotor 300 in the above embodiment, the heated workpiece is the motor rotor 300. When a component inside the mold cavity surrounded by the vacuum bag for the motor rotor is desorbed (for either primary curing or secondary curing), the position and attitude controller controls, based on the position signal detected by the position sensor, the running mechanism to move to a target position of a predetermined station of the moving main body 902 with respect to the support base; at the same time, the position and attitude controller adjusts the attitude of the electromagnetic coil based on the position signal detected by the position detection component to maintain the circumferential interval between the outer surface of the electromagnetic coil and the vacuum bag 501 of the motor rotor during the movement of the electromagnetic coil, thereby positioning the electromagnetic coil in the inner cavity of the motor rotor 300, finally, the magnet yoke wall and the magnet steels of the motor rotor are heated according to the principle of heating with an electromagnetically induced eddy current.

If the circumferential distance between the electromagnetic coil and the vacuum bag 501 is less, the heating effect is better. Considering that the electromagnetic coil cannot be scratched by the outer wall of the vacuum bag 501 when the electromagnetic coil is placed into or removed from the interior of the motor rotor, a certain gap should be maintained between the electromagnetic coil and the vacuum bag 501, and the gap may be set according to a practical application environment.

The principle of heating with the eddy current induced by the electromagnetic induction may be simply explained as follows. When the electromagnetic coil heats the motor rotor 300 (the heated workpiece), electromagnetic cables 903 of the electromagnetic coil are equivalent to a primary coil, and the motor rotor 300 is equivalent to a coil of a secondary transformer, that is, a secondary coil is the rotor which forms a closed loop itself. The primary coil is charged with an intermediate-frequency current or a power-frequency alternating current, then a current may be induced on the magnet yoke wall of the inner surface of the motor rotor and the surface of the magnet steel, and the current may generate heat in accordance with the heating effect. A proximity effect occurs when the eddy current is generated by the electromagnetic induction on the surface of the motor rotor 300, that is, the intensity of the induction is larger closer to the electromagnetic coil and the intensity of the induction current is smaller further away from the electromagnetic coil. Therefore, in order to make the inner surface of the entire motor rotor 300 equally heated (the magnet steels and the magnet yoke wall are equally heated), circumferential portions of the electromagnetic coil are equally spaced from the motor rotor.

In an ideal state, in the process that the position and attitude controller controls the electromagnetic coil to move and the electromagnetic coil heats the motor rotor 300, the outer surface of the electromagnetic coil is equally spaced from circumferential positions of the workpiece to be heated (the motor rotor). Of course, in practical operation, a certain deviation in the circumferential intervals may be allowed, as long as the circumferential intervals of the electromagnetic coil are within an allowable deviation range, that is, the movement requirements and the heating requirements described above may be considered to be satisfied.

The power-frequency alternating current in China has a frequency of 50 Hz, and power-frequency alternating currents of other countries may alternatively be provided. The frequency of an intermediate-frequency alternating current is greater than 50 Hz or greater than the frequency of a power-frequency alternating current of the country where the intermediate-frequency alternating current is used.

The electromagnetic coil may specifically include a coil bobbin 904 and the electromagnetic cables 903 wound around the coil bobbin 904, and the electromagnetic cables 903 are evenly arranged in a winding direction. The position and attitude controller adjusts the position of the coil bobbin based on the position signal detected by the position detection component, so as to maintain an outer surface of the coil bobbin being circumferentially spaced from the motor rotor 300 (the heated workpiece) during the movement.

The coil bobbin 904 is preferably made from a non-magnetically conductive and non-electrically conductive material (such as resin-coated wood and a composite material) with a very low coefficient of thermal storage.

The electromagnetic cables 903 are evenly arranged on the coil bobbin 904 in an axial direction of the coil bobbin 904, which facilitates the electromagnetic coil evenly heating axial positions of the motor rotor 300.

Specifically, the coil bobbin 904 is provided with multiple cable ducts 9041 at equal pitches and equal radiuses. The electromagnetic cables 903 are wound into the cable ducts 9041, and the depth of each of the cable ducts 9041 is greater than or equal to the diameter of the electromagnetic cable 903.

In this way, the electromagnetic cables 903 may be equally spaced from the circumferential positions of the motor rotor by controlling the machining precision of the cable duct 9041, and the structure is simple and easy to be implemented.

For the motor rotor 300 placed horizontally in the axial direction of the motor rotor 300, the electromagnetic coil should also be arranged horizontally in the axial direction of the motor rotor 300, and reference may be made to the following.

In the embodiments described above, the moving main body 902 includes a body 9021 and a horizontal cantilever module 9022. The running mechanism, the position and attitude controller and a power supply 906 are all integrated into the body 9021. A fixed end of the horizontal cantilever module 9022 is connected to the body 9021. The coil bobbin 904 is provided at a suspension end of the horizontal cantilever module 9022. The industrial robot further includes a first drive source for driving the horizontal cantilever module 9022 to move radially with respect to the body 9021. The first drive source may be a motor or a hydraulic power supply, and is preferably a hydraulic power supply herein.

In order to precisely place the electromagnetic coil inside the motor rotor 300, the horizontal cantilever module 9022 may be an extensible and retractable cantilever. Correspondingly, the industrial robot may further include a second drive source for driving the horizontal cantilever module 9022 to extend and retract in a horizontal direction. The second drive source may be a motor or a hydraulic power supply. The second drive source is preferably a hydraulic power supply herein. The body 9021 may be provided with a hydraulic system 905. Power for the running mechanism, the first drive source and the second drive source all come from the hydraulic system 905.

When the position and attitude controller determines that the intervals between the coil bobbin 904 and the motor rotor 300 in a circumferential direction of the motor rotor 300 are not equal or beyond (or within) a predetermined range based on the signal detected by the position detection component, the first drive source may drive the horizontal cantilever module 9022 to move with respect to the body 9021 in a direction in which the intervals between the coil bobbin 904 and the motor rotor becomes larger in a radial direction, finally, the horizontal cantilever module 9022 moves to a position where the intervals between the coil bobbin 904 and the motor rotor 300 in the circumferential direction of the motor rotor 300 are equal or within the predetermined range.

Referring FIGS. 17 to 20, in an embodiment, the position detection component includes distance measuring sensors evenly distributed in a circumferential direction of the coil bobbin. Four distance measuring sensors are provided, which are respectively distributed in a 6 o'clock direction, a 9 o'clock direction, a 12 o'clock direction and a 3 o'clock direction. The four distance measuring sensors are respectively defined as a first distance measuring sensor 9071, a second distance measuring sensor 9072, a third distance measuring sensor 9073 and a fourth distance measuring sensor 9074 herein. At a moment, an upper gap between the coil bobbin 904 and the inner wall of the motor rotor 300 detected by the first distance measuring sensor 9071 is less than a lower gap between the coil bobbin 904 and the inner wall of the motor rotor 300 detected by the third distance measuring sensor 9073. The position and attitude controller controls the entire horizontal cantilever module 9022 to move upwards, and the horizontal cantilever module 9022 finally moves to a position where the upper gap between the coil bobbin 904 and the motor rotor 300 is substantially equal to the lower gap between the coil bobbin 904 and the motor rotor 300. A dotted line in the figure indicates a final movement position of the coil bobbin 904.

Figure 21:
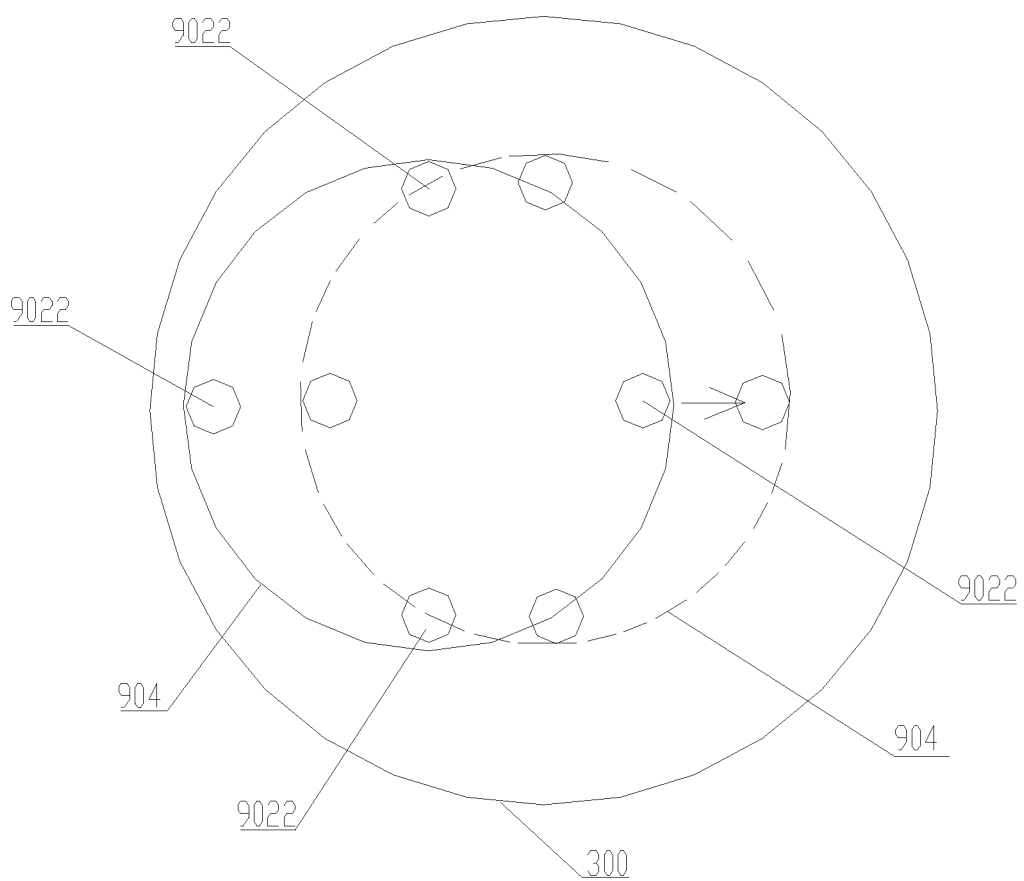
FIG. 21 is a schematic view showing the attitude of the coil bobbin according to a second embodiment of the present application.

Similarly, FIG. 21 also shows an embodiment in which the coil bobbin 904 is driven by the horizontal cantilever module 9022 to move left and right. The detection principle and the principle of the left and right movement of the horizontal cantilever module 9022 are respectively the same as the detection principle and the principle of the up and down movement of the horizontal cantilever module 9022 described above, which is not described again here.

In addition, during the movement of the coil bobbin 904, the coil bobbin 904 does not always move horizontally and may lose balance. Thus, the motor rotor 300 may not be equally spaced from the coil bobbin 904 in the circumferential direction merely by radially moving the horizontal cantilever module 9022. The following improvements are made to the above device herein.

Furthermore, the horizontal cantilever module 9022 includes at least two horizontal cantilevers which are evenly distributed along an outer peripheral edge of the coil bobbin 904. An embodiment in which the horizontal cantilever module 9022 includes four horizontal cantilevers is provided herein.

The four horizontal cantilevers are respectively defined as a first horizontal cantilever 90221, a second horizontal cantilever 90222, a third horizontal cantilever 90223 and a fourth horizontal cantilever 90224 herein. The horizontal cantilevers are also respectively distributed in the 6 o'clock direction, the 9 o'clock direction, the 12 o'clock direction and the 3 o'clock direction, that is, the horizontal cantilever module 9022 and the distance measuring sensors 907 are axially arranged in one to one opposition to each other.

Figure 19:
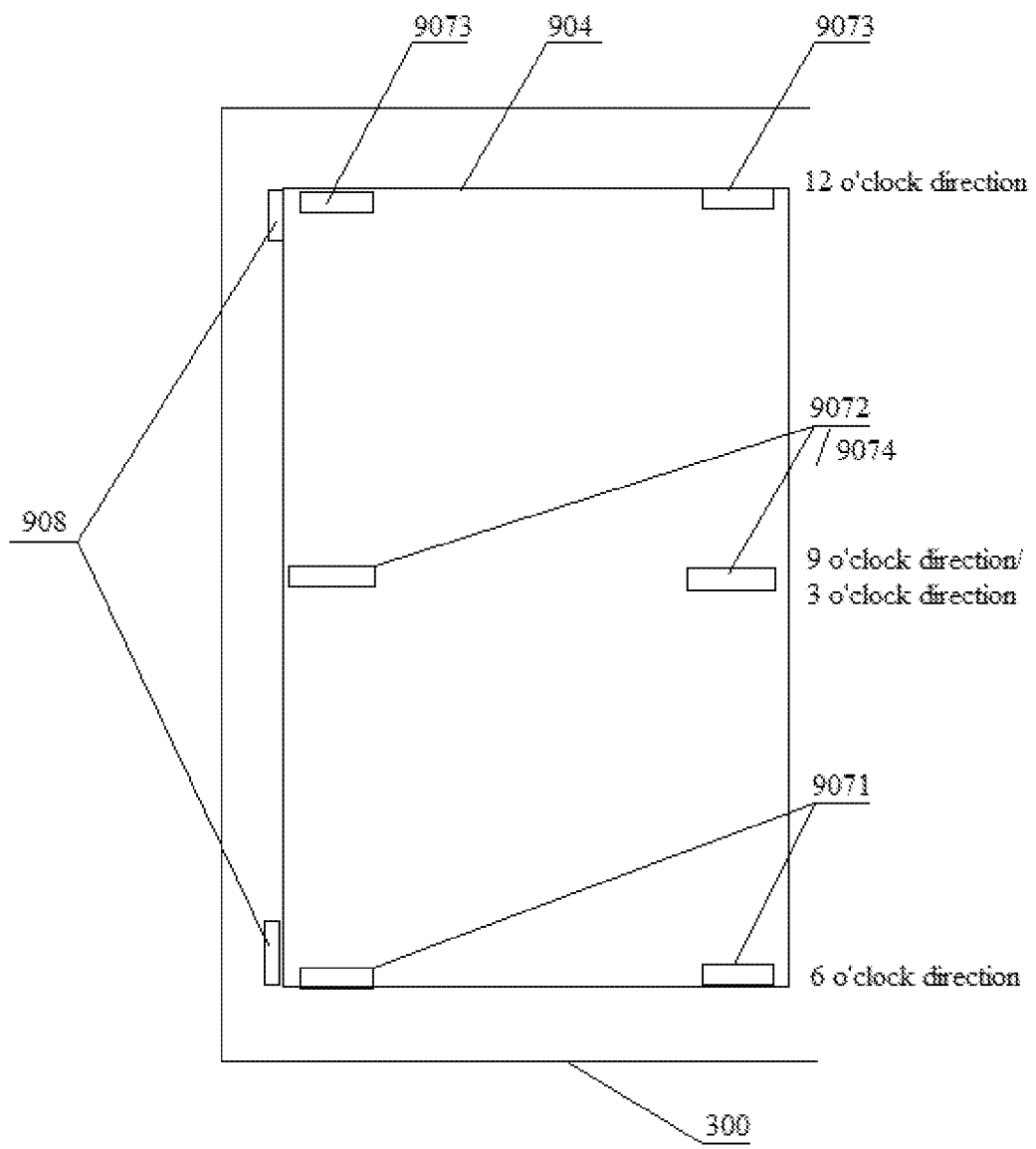
FIG. 19 is a front view of the position detection component arranged on the coil bobbin according to the embodiment of the present application.
Figure 20:
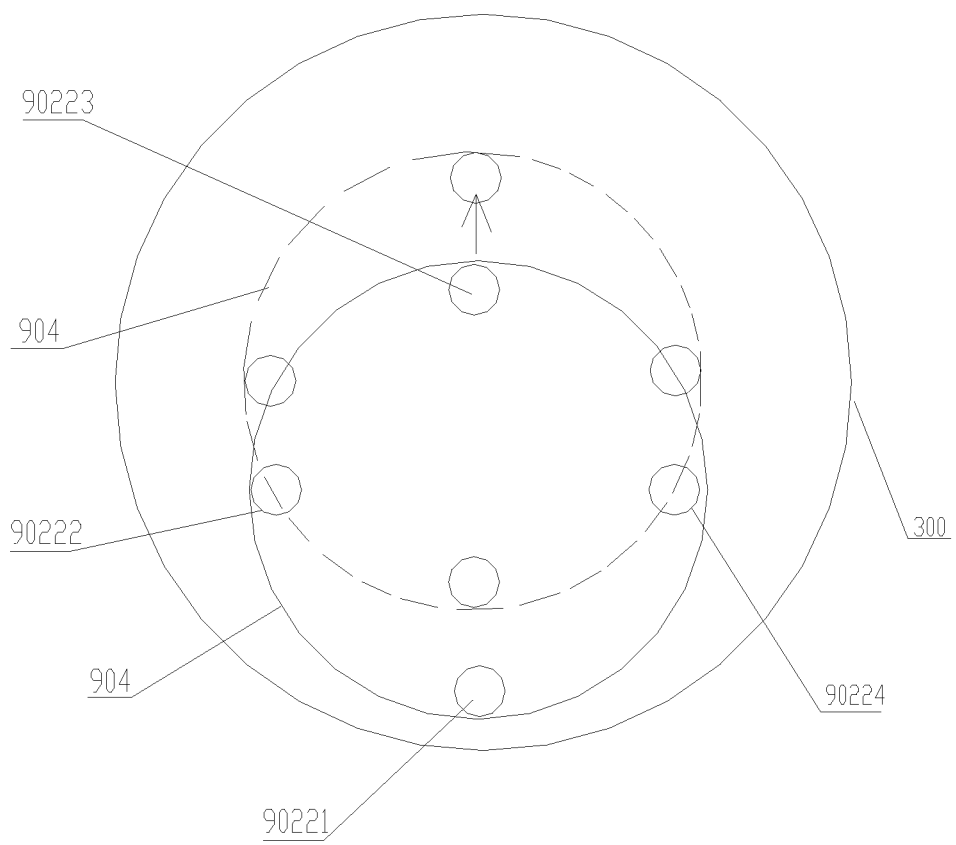
FIG. 20 is a schematic view showing the attitude of the coil bobbin according to a first embodiment of the present application.

Referring to FIG. 19 again, in an embodiment, a set of distance measuring sensors is provided in the same axial direction. One set of distance measuring sensors include at least two distance measuring sensors 907. FIG. 19 shows an embodiment in which one set of distance measuring sensors includes two distance measuring sensors, the distance measuring sensors 907 in the same set are arranged at intervals in the same axial direction, and the positions of the distance measuring sensors 907 in the same set may be arbitrary. Herein, the technical solution is further described by taking the two distance measuring sensors 907 in the same set being respectively arranged at two ends as an example.

Figure 22:
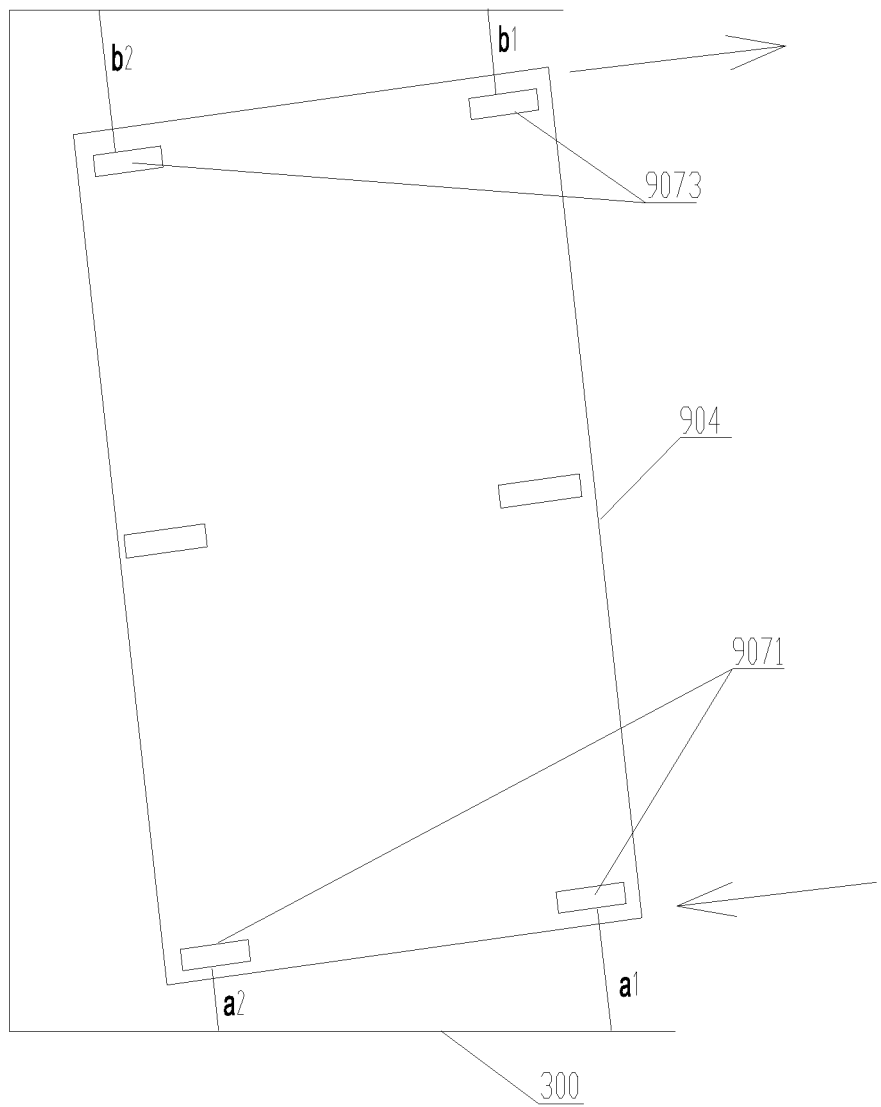
FIG. 22 is a schematic view showing the attitude of the coil bobbin according to a third embodiment of the present application.

At a moment, the position and attitude controller may compare only the gaps detected by two distance measuring sensors 907 located at a single side. For example, by the two first distance measuring sensors 9071 respectively calculating an interval a2 between a front end of the coil bobbin 904 and the motor rotor and an interval a1 between a rear end of the coil bobbin 904 and the motor rotor, the position and attitude controller compares a1 and a2. When it is determined that a1 is not equal to a2 or the difference between a1 and a2 is greater than a predetermined value, an extension and retraction speed or an extension and retraction direction of the horizontal cantilever module 9022 is adjusted. As shown in FIG. 22, when it is determined that a1 is greater than a2, the first horizontal cantilever 90221 is controlled to extend forward and the third horizontal cantilever 90223 is controlled to retract backward; or when a1 is greater than a2, an extension speed of the first horizontal cantilever 90221 is controlled greater than an extension speed of the third horizontal cantilever 90223.

Figure 23:
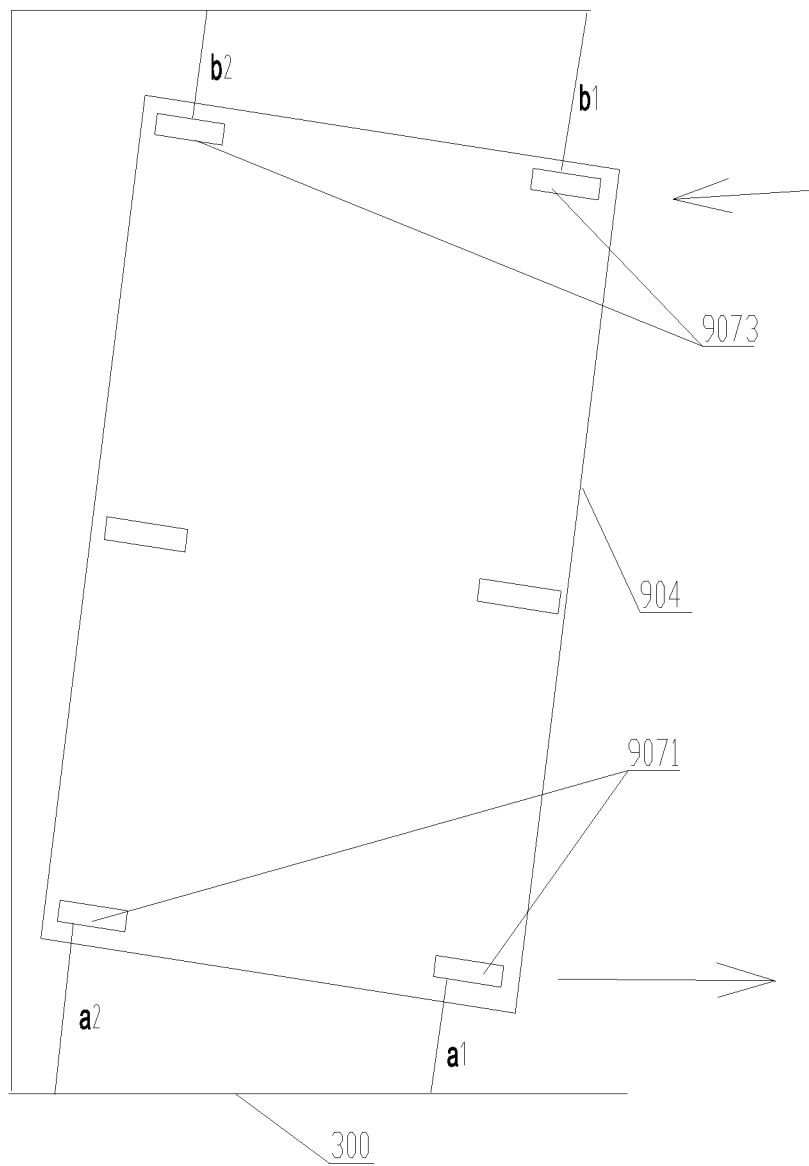
FIG. 23 is a schematic view showing the attitude of the coil bobbin according to a fourth embodiment of the present application.

As shown in FIG. 23, when it is determined that a1 is less than a2, the first horizontal cantilever 90221 is controlled to retract backward and the third horizontal cantilever 90223 is controlled to extend forward; or when a1 is less than a2, the extension speed of the first horizontal cantilever 90221 is controlled less than the extension speed of the third horizontal cantilever 90223.

Of course, the position and attitude controller may further calculate gaps b1 and b2 based on the position signals detected by the two third distance measuring sensors 9073 located in the 12 o'clock direction, so as to further control the movement of each of the horizontal cantilevers.

Of course, in order to improve the accuracy of determination, the position and attitude controller may also control the movement of the horizontal cantilevers based on the position signals detected by the two or more sets of distance measuring sensors, for example, the position and attitude controller determines the attitude of the coil bobbin through two first distance measuring sensors 9071 and two three distance measuring sensor 9073 for further controlling the movement of each of the horizontal cantilevers.

The moving main body 902 is further integrated with a heating controller. The heating controller controls on and off of the power supply 906 for the electromagnetic coil and/or the frequency of the alternating current supplied by the power supply 906 based on a temperature signal and/or a humidity signal (such as a temperature signal and/or a humidity signal of each of the magnet steel, the magnet yoke wall and the reinforcing material) of the heated workpiece.

Figure 24:
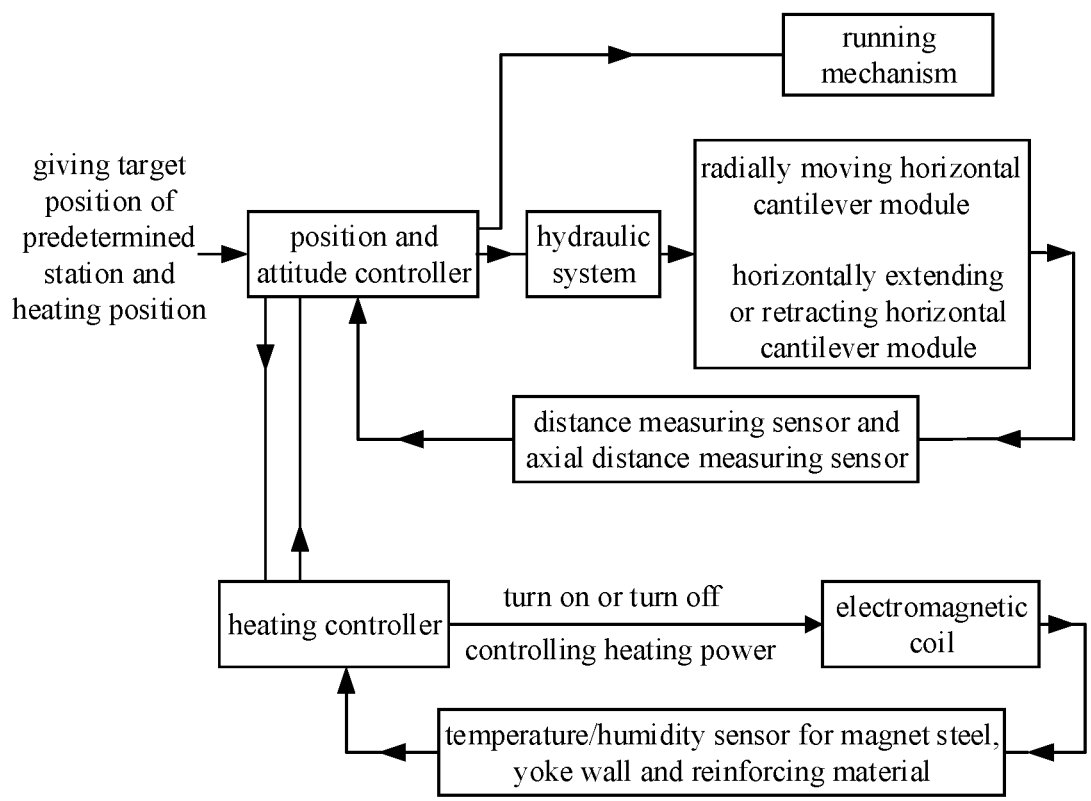
FIG. 24 is a view showing the control principle of the industrial robot applied in the forming process of forming the protective coating for the motor rotor according to the present application.

Referring to FIG. 24, in the above embodiment, the heating controller may interactively communicate with the position and attitude controller. When the position and attitude controller determines that the electromagnetic coil assembly is moved to the heating position based on the signal from the position detection component, the position and attitude controller sends a command to the heating controller, and the heating controller activates the power supply to allow the power supply to supply an alternating current to the electromagnetic coil, for heating the heated workpiece.

In addition, when the heating controller determines that the desorption process or the curing process is completed based on the temperature signal and/or the humidity signal of the motor rotor 300 (the heated workpiece), the heating controller disconnect the power supply from the electromagnetic coil and sends a command to the heating controller, then the heating controller controls the electromagnetic coil to exit the heating position and further controls the moving main body to exit the target position of the predetermined station.

Furthermore, during the exiting of the electromagnetic coil from the heating position, the position and attitude controller adjusts the attitude of the electromagnetic coil in real time based on the position signal detected by the position detection component, so as to maintain the outer surface of the electromagnetic coil being circumferentially spaced from the heated workpiece.

When it is required to desorb the motor rotor using the industrial robot or heat the adhesive to primarily cure or secondarily cure the adhesive, the moving main body 902 may be moved along the slide rail 901 such that the coil bobbin 904 is placed in the interior of the motor rotor. When the operation of the electromagnetic coil is completed or it is not required to heat the components and parts or the adhesive layer inside the vacuum bag 501 using the electromagnetic coil, the heating controller turns off the power supply and sends a command to the position and attitude controller. The position and attitude controller controls the hydraulic system to operate, so as to allow the electromagnetic coil to exit from the interior of the motor rotor 300 and to move the moving main body 902 along the slide rail 901 to an initial position and away from the motor rotor 300. This greatly increases the convenience of the adhesive injection of the motor rotor 300 and other operations.

In the embodiment of the present application, the magnet yoke wall 303 and the vacuum bag 501 located in the radial direction of the motor rotor are used as target bodies to be symmetrically heated. The temperatures at two sides of a heated zone are controlled. When the two sides of the heated zone are evenly heated, the temperature at two sides of the adhesive located at the magnetic pole component 301 symmetrically increases, which reduces the thermal stress caused by the temperature difference between "the circumference of the magnetic pole component 301 and the circumference of the reinforcing material 304 for the magnetic pole component 301". Based on this, the power density of composite heat exchange of the convective heat transfer, including the constant heat flux density, the constant wall temperature and the heat radiation (infrared ray) occurring at the outer wall of the vacuum bag 501, for the heat conduction outside the magnet yoke wall 303 of the rotor is determined.

Specifically, the control strategy for symmetrical distribution of the temperature of the adhesive layer is that: a second heating device 700 is provided at an outer peripheral wall of the magnet yoke wall 303 in advance, and the second heating device 700 heats the outer wall of the magnet yoke wall opposite to the arc section located at the bottom of the motor rotor; a third heating device (not shown) is provided in a space surrounded by the outer sidewall of the vacuum bag 501 in advance, the third heating device heats an outer side of the bottom arc section, and the heating power of each of the third heating device and the second heating device 700 is adjusted to allow the temperature of an inner sidewall of the magnet yoke wall 303 to be substantially equal to the temperature of the inner sidewall of the vacuum bag 501. The third heating device may be a far-infrared heating component. For the specific structure of the third heating device, reference is made to the conventional technology, which is not described herein.

It should be noted that, the "substantially equal" described in the embodiment of the present application means that two numbers are equal in terms of their absolute values or there is an allowable deviation between the two numbers, that is, the two numbers have an allowable predetermined error.

Referring to FIG. 8, the second heating device 700 may include an induction heating power supply 701, an electromagnetic cable 702 and a temperature sensor 703. The electromagnetic cable 702 is wound around the outer peripheral wall of the magnet yoke wall 303. The temperature sensor is mounted to the outer peripheral wall of the magnet yoke wall 303 for sensing the temperature of the outer wall of the magnet yoke wall 303.

Compared with vertical injection of the adhesive into the motor rotor in conventional technology, in the forming process apparatus for forming the protective coating for the magnetic pole of the permanent magnet motor according to the embodiment of the present application, the motor rotor may be placed horizontally. When the adhesive is injected to the arc section located at the bottom of the motor rotor, the adhesive impregnates clearance between the magnet steel (the magnetic pole component) and the magnet yoke wall and the reinforcing material 304, at the same time, the adhesive is affected by the gravity, the radial pressure gradient and the axial pressure gradient, i.e. the adhesive seeps in a vertical downward gravity direction and the adhesive impregnates the reinforcing material 304 and diffuses in the reinforcing material 304, which addresses filling issues of filling the clearance between the magnet steel and the magnet yoke wall and the clearance between the magnet steel and a magnet steel layer, thus, filling of the clearance with the adhesive is ensured, the magnet steel is wrapped, and the corrosion of the magnet steel by the air carrying salt frog and water vapor is avoided. In this way, since there is a medium between the magnet steel and the magnet yoke wall for transferring the heat generated in operation, temperature rise of the magnet steel may be suppressed, thus, the performance of the magnet steel may not be destroyed due to the temperature rise and the corrosion.

In a preferred embodiment, the inlets and the outlets of the vacuum bag 501 may be respectively provided close to two end surfaces of the motor rotor, and the step of injecting the adhesive into the arc section located at the bottom of the motor rotor in step S2 specifically includes: applying a vibration force to the adhesive inside the vacuum bag 501 after the adhesive inside the vacuum bag 501 reaches the other end surface of the motor rotor.

Since the process apparatus according to the embodiment of the present application is applied to the forming process for forming the protective coating for the magnetic pole of the permanent magnet motor described above, the process apparatus also has the above technical effects of the forming process for forming the protective coating for the magnetic pole of the permanent magnet motor.

The terms "first" and "second" and the like described in the embodiments of the present application are merely used to distinguish different components with the same structure or similar structures, and do not imply any special limitation on the order.

The process and the process apparatus for forming the protective coating for the magnetic pole of the permanent magnet motor according to the present application are described in detail hereinbefore. The principle and the embodiments of the present application are illustrated herein by specific examples. The above description of examples is only intended to help the understanding of the concept of the present application. It should be noted that, for the person skilled in the art, a few of improvements and modifications may be made to the present application without departing from the principle of the present application, and these improvements and modifications are also deemed to fall into the scope of protection of the present application defined by the claims.

The invention claimed is:

1. A process apparatus for forming a protective coating for a magnetic pole of a permanent magnet motor, wherein an inner wall of a magnet yoke wall of a motor rotor of the permanent magnet motor is provided with a vacuum bag, and the inner wall of the magnet yoke wall and an outer peripheral wall of the vacuum bag form a mold cavity required for injection of an adhesive, the process apparatus comprising:
- a positioning component configured to axially position the motor rotor at a horizontal position;
- a drive component configured to drive the motor rotor to rotate with respect to a horizontal central axis of the motor rotor;
- an adhesive injection assembly configured to evacuate an arc section of the motor rotor located at a bottom of the motor rotor and to inject the adhesive into the arc section; and
- a vibration component, wherein the vibration component comprises a first vibration component located at an outer side of the motor rotor, and the first vibration component allows an outer peripheral wall of the arc section located at the bottom of the motor rotor to vibrate.

2. The process apparatus according to claim 1, wherein a flexible coupling and a transition joint are provided successively between a drive shaft of a drive component and the motor rotor, and the transition joint comprises a large end cooperatively connected to a flange of the motor rotor and a small end cooperatively connected to a power output end of the flexible coupling.

3. The process apparatus according to claim 1, further comprising:
- a desorption assembly which comprises:
  - a gas source having an outlet communicated an inlet of the vacuum bag;
  - a heater provided in a communication pipeline communicating the gas source with an inlet of the vacuum bag for heating gas flowing into the vacuum bag; and
  - an on-off valve provided at an outlet of the gas source for controlling opening and closing of a pipeline between the gas source and the vacuum bag;
- wherein the process apparatus further comprises a controller, which pre-stores a desorption control module, wherein the desorption control module determines a time duration of dry and clean hot air from the gas source entering into an interior of the mold cavity according to a signal from a temperature sensor, a signal from a humidity sensor and a mass of the magnetic pole component, and the temperature sensor and the humidity sensor are mounted inside the vacuum bag.

4. The process apparatus according to claim 3, wherein the desorption assembly further comprises a heat exchanger, and in desorbing, heat is transferred between gas in a gas inlet main pipeline communicated with the vacuum bag and gas in a gas outlet main pipeline communicated the vacuum bag through the heat exchanger.

5. The process apparatus according to claim 3, further comprising an inlet fluid slip ring and an outlet fluid slip ring, wherein inlet main pipelines for the gas or the adhesive are respectively accessed to the inlets of the vacuum bag through the corresponding inlet fluid slip ring, and a fluid medium in the vacuum bag flow together into an outlet main pipeline for the gas or the adhesive through the outlet fluid slip ring connected to the outlets.

6. The process apparatus according to claim 3, further comprising a first heating device, wherein the first heating device is detachable in an inner cavity of the motor rotor and located at an outer side of the vacuum bag, and the first heating device is configured to heat the adhesive inside the vacuum bag.

7. The process apparatus according to claim 6, wherein the first heating device is an electromagnetic coil, the electromagnetic coil comprises a coil bobbin and an electromagnetic cable wound around the coil bobbin, and the electromagnetic cable is arranged evenly in an axial direction of the coil bobbin.

8. The process apparatus according to claim 7, further comprising a moving main body and a slide rail, wherein the slide rail is transversely provided on a support base, the moving main body includes a body and an extensible and retractable horizontal cantilever module, a slider is provided at a bottom of the body, the slider slides in cooperation with the slide rail, and the coil bobbin is provided at a suspension end of the horizontal cantilever module; the horizontal cantilever module is radially movable with respect to the body.

9. The process apparatus according to claim 8, wherein at least two distance measuring sensors are further evenly distributed at an outer sidewall of the coil bobbin in a circumferential direction of the coil bobbin for detecting a distance between the corresponding outer sidewall of the coil bobbin and an outer sidewall of the vacuum bag; the horizontal cantilever module adjusts an attitude of the coil bobbin according to detection signals of the distance measuring sensors, which allows the coil bobbin to be circumferentially spaced from the outer sidewall of the vacuum bag during movement of the coil bobbin.

10. The process apparatus according to claim 9, wherein at least two horizontal cantilevers are provided, the horizontal cantilevers are evenly arranged along an outer peripheral edge of the coil bobbin, and the attitude of the coil bobbin is adjusted by controlling an extension or retraction speed of each of the horizontal cantilevers, which allows the coil bobbin to be circumferentially spaced from a heated workpiece during the movement of the coil bobbin.

11. The process apparatus according to claim 10, wherein at least two sets of distance measuring sensors are provided, each set of distance measuring sensors has at least one sensor, and the distance measuring sensors in each set are evenly arranged on an outer circumferential surface of the coil bobbin.

12. The process apparatus according to claim 10, wherein the number of sets of distance measuring sensors is the same as the number of the horizontal cantilevers, and each set of the distance measuring sensors axially corresponds to a respective one of the horizontal cantilevers.

13. The process apparatus according to claim 9, further comprising a position and attitude controller, and the position and attitude controller controls operation of the hydraulic system based on position signals detected by a distance measuring sensor for measuring a circumferential distance and detected by a distance measuring sensor for measuring an axial distance.

14. The process apparatus according to claim 13, wherein the position and attitude controller interactively communicates with a heating controller, and after the position and attitude controller determines that the electromagnetic coil is moved to a heating position based on a signal from a position detection component, the position and attitude controller sends an instruction to the heating controller and then the heating controller activates the power supply to supply the alternating current to the electromagnetic coil for heating the motor rotor.

15. The process apparatus according to claim 14, wherein when the heating controller determines that a desorption process or a curing process is completed based on the temperature signals and/or humidity signals corresponding to the magnet yoke wall, the magnet steel and the reinforcing material inside the vacuum bag, the heating controller disconnects the power supply from the electromagnetic coil and sends an instruction to the heating controller, then the heating controller controls the electromagnetic coil to exit a heating position and further controls the moving main body to exit a target position of a predetermined station.

16. The process apparatus according to claim 15, wherein during exiting of the electromagnetic coil from the heating position, the position and attitude controller adjusts the attitude of the electromagnetic coil in a real time manner based on a position signal detected by a detection component, which allows an outer surface of the electromagnetic coil to be spaced from the outer peripheral wall of the vacuum bag during the movement of the electromagnetic coil.

17. The process apparatus according to claim 16, further comprising a second heating device, wherein the second heating device comprises an induction heating power supply, an electromagnetic cable and a temperature sensor, the electromagnetic cable is wound around an outer sidewall of the motor rotor, and the temperature sensor is configured to sense a temperature of the outer sidewall of the motor rotor.

18. The process apparatus according to claim 1, further comprising:
a power supply;
an inner pole plate; and
an outer pole plate,
wherein the inner pole plate and the outer pole plate are respectively connected to two electrodes of the power supply, the inner pole plate and the outer pole plate are respectively provided opposite to an inner wall of the vacuum bag and an outer wall of the motor rotor, and the inner pole plate and the outer pole plate have shapes respectively matching the shapes of the inner wall and an outer wall, to which the inner pole plate and the outer pole plate are respectively opposite, of the motor rotor; and
the process apparatus further comprises a processor which determines a thickness of an adhesive layer based on capacitance between the inner pole plate and the outer pole plate.

19. The process apparatus according to claim 1, wherein the positioning component comprises a support platform, and the support platform is provided with at least two rollers, and an outer sidewall of the motor rotor is supported on the support platform via the at least two rollers.

20. The process apparatus according to claim 1, further comprising an ultraviolet radiation component, wherein the ultraviolet radiation component is located in an inner cavity of the motor rotor and provided opposite to an outer sidewall of the vacuum bag, for primarily curing the adhesive in the arc section located at the bottom of the motor rotor.

21. A process for forming a protective coating for a magnetic pole of a permanent magnet motor, comprising:
step S1, assembling a vacuum bag to a magnet yoke wall of a motor rotor, an inner peripheral wall of the vacuum bag and an inner wall of the magnet yoke wall forming a mold cavity required to inject an adhesive, and a magnetic pole component, a batten and a reinforcing material being enclosed by the mold cavity; and axially positioning the assembled motor rotor at a horizontal position;
step S2, controlling positions of an inlet and an outlet of the vacuum bag in a current state, to only desorb an arc section located at a bottom of the motor rotor and to inject the adhesive into the arc section; and after the adhesive in the above arc section is primarily cured, driving the motor rotor to rotated by a predetermined angle for rotating a next arc section not Injected with adhesive to the bottom of the motor rotor;
step S3, repeating step S2 until injection of the adhesive into all circumferential arc sections of the motor rotor is completed, and finally secondarily curing the entire protective coating which is primarily cured; and
wherein an inlet and an outlet of the vacuum bag are respectively provided close to two end surfaces of the motor rotor, and injecting the adhesive into the arc section located at the bottom of the motor rotor in step S2 comprises: after the adhesive inside the vacuum bag reaches the other end surface of the motor rotor, vibrating the adhesive inside the vacuum bag.

22. The process for forming the protective coating for the magnetic pole of the permanent magnet motor according to claim 21, wherein a desorption process specifically comprises:
evacuating an interior of the vacuum bag; or
communicating the inlet of the vacuum bag with a high-pressure hot air source and communicating the outlet of the vacuum bag with a low-pressure circuit to allow dry and clean hot air to enter into the vacuum bag; or
heating components and parts inside the mold cavity by an electromagnetically induced eddy current while evacuating the mold cavity or allowing dry and clean airflow to enter.

23. The process for forming the protective coating for the magnetic pole of the permanent magnet motor according to claim 22, wherein in the process of allowing the dry and clean hot air to enter into the mold cavity, the following steps are performed at the same time:
detecting a temperature and a humidity of a surface of each of the batten, the magnetic pole component and the magnet yoke wall as well as a known mass of the magnetic pole component, and determining a predetermined time duration of the dry and clean hot air entering into an interior of the mold cavity based on the temperature, the humidity and the mass which are detected.

24. The process for forming the protective coating for the magnetic pole of the permanent magnet motor according to claim 21, wherein while the vibrating is applied, the arc section into which the adhesive is injected is driven to reciprocatingly swing to allow two ends of the arc section to swing alternately to a 6 o'clock position and to stay at the 6 o'clock position for a predetermined time.

25. The process for forming the protective coating for the magnetic pole of the permanent magnet motor according to claim 21, wherein a thickness of an adhesive layer that is formed is further measured in a real time manner during injection of the adhesive into the arc section located at the bottom of the motor rotor, and if a difference between the thickness of the adhesive layer and a preset thickness is within a predetermined range, a control instruction is sent to close an inlet of the vacuum bag.

26. The process for forming the protective coating for the magnetic pole of the permanent magnet motor according to claim 25, wherein a secondary curing process comprises: heating the adhesive injected into the vacuum bag to increase a temperature of the adhesive, and controlling a temperature of the adhesive layer formed between the magnet yoke wall and an inner sidewall of the vacuum bag to be distributed symmetrically about a circumferential plane where a radial center between the magnet yoke wall and the inner sidewall of the vacuum bag is located.

27. The process for forming the protective coating for the magnetic pole of the permanent magnet motor according to claim 26, wherein allowing the temperature of the adhesive layer between the magnet yoke wall and the inner sidewall of the vacuum bag to be distributed symmetrically about a circumferential plane where the radial center between the magnet yoke wall and the inner sidewall of the vacuum bag is located comprises: pre-setting a second heating device at an outer peripheral wall of the magnet yoke wall, pre-setting a first heating device in a space surrounded by the inner sidewall of the vacuum bag, and adjusting a heating power of each of the first heating device and the second heating device to allow a temperature of an inner sidewall of the magnet yoke wall to be substantially equal to a temperature of the inner sidewall of the vacuum bag.

* * * * *

UNITED STATES PATENT AND TRADEMARK OFFICE
CERTIFICATE OF CORRECTION

PATENT NO. : 10,840,783 B2
APPLICATION NO. : 16/067774
DATED : November 17, 2020
INVENTOR(S) : Shengjun Ma et al.

Page 1 of 1

It is certified that error appears in the above-identified patent and that said Letters Patent is hereby corrected as shown below:

On the Title Page

Item (30), under "Foreign Application Priority Data," "2016 1 0943100" should read --2016 1 0943100.7--.

In the Claims

Claim 21, Column 28, Line 7, "Injected" should read --injected--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*